(12) United States Patent
Pan

(10) Patent No.: US 10,904,016 B1
(45) Date of Patent: Jan. 26, 2021

(54) IDENTITY VERIFICATION

(71) Applicant: Advanced New Technologies Co., Ltd., George Town (KY)

(72) Inventor: Wuqiong Pan, Hangzhou (CN)

(73) Assignee: Advanced New Technologies Co., Ltd., George Town (KY)

(*) Notice: Subject to any disclaimer, the term of this patent is extended or adjusted under 35 U.S.C. 154(b) by 0 days.

(21) Appl. No.: 16/810,934

(22) Filed: Mar. 6, 2020

Related U.S. Application Data

(63) Continuation of application No. PCT/CN2020/071978, filed on Jan. 14, 2020.

(30) Foreign Application Priority Data

Jul. 24, 2019 (CN) .......................... 2019 1 0670766

(51) Int. Cl.
*H04L 9/32* (2006.01)

(52) U.S. Cl.
CPC .......... *H04L 9/3268* (2013.01); *H04L 9/3247* (2013.01)

(58) Field of Classification Search
CPC ............................ H04L 9/3268; H04L 9/3247
USPC ........................................................ 713/156
See application file for complete search history.

(56) References Cited

U.S. PATENT DOCUMENTS

| | | | | |
|---|---|---|---|---|
| 5,878,144 A * | 3/1999 | Aucsmith | ............... | G06F 21/32 380/30 |
| 6,499,110 B1 * | 12/2002 | Moses | ................... | G06F 21/602 713/151 |
| 6,802,002 B1 * | 10/2004 | Corella | ................... | G06F 21/33 713/155 |
| 9,544,148 B2 * | 1/2017 | Brown | ................... | H04L 9/3247 |
| 9,680,644 B2 | 6/2017 | Chen et al. | | |
| 9,954,687 B2 * | 4/2018 | Cross | ................... | H04L 63/0823 |
| 10,102,526 B1 * | 10/2018 | Madisetti | .............. | H04L 9/3239 |
| 10,404,471 B1 * | 9/2019 | Griffin | ................... | H04L 9/3247 |
| 10,454,690 B1 * | 10/2019 | Popoveniuc | ............ | H04L 9/088 |
| 2002/0026582 A1 * | 2/2002 | Futamura | .............. | H04L 9/3268 713/170 |

(Continued)

FOREIGN PATENT DOCUMENTS

| CN | 101241528 | 8/2008 |
|---|---|---|
| CN | 102594558 | 7/2012 |

(Continued)

OTHER PUBLICATIONS

Crosby et al., "BlockChain Technology: Beyond Bitcoin," Sutardja Center for Entrepreneurship & Technology Technica Report, Oct. 16, 2015, 35 pages.

(Continued)

*Primary Examiner* — Shahriar Zarrineh
(74) *Attorney, Agent, or Firm* — Fish & Richardson P.C.

(57) ABSTRACT

A computer-implemented method includes: verifying, by a trusted server, an identity of a first terminal; determining that the verification is a success; based on determining that the verification is a success, determining, using a remote attestation protocol, that the first terminal is in a trusted state; and based on determining that the first terminal is in the trusted state, issuing a digital certificate including a trusted identifier to the first terminal, in which the digital certificate is usable by a second terminal to verify the identity of the first terminal.

13 Claims, 13 Drawing Sheets

(56) References Cited

U.S. PATENT DOCUMENTS

| | | | |
|---|---|---|---|
| 2002/0027992 A1* | 3/2002 | Matsuyama | H04L 9/321 |
| | | | 380/231 |
| 2002/0108041 A1* | 8/2002 | Watanabe | H04L 9/3249 |
| | | | 713/175 |
| 2007/0094493 A1* | 4/2007 | Ali | G06F 21/34 |
| | | | 713/156 |
| 2007/0136599 A1* | 6/2007 | Suga | H04L 9/3247 |
| | | | 713/176 |
| 2007/0150723 A1* | 6/2007 | Estable | H04L 63/0823 |
| | | | 713/155 |
| 2008/0037776 A1* | 2/2008 | Akiyama | H04L 9/3093 |
| | | | 380/44 |
| 2008/0133414 A1* | 6/2008 | Qin | G06F 21/10 |
| | | | 705/50 |
| 2008/0228651 A1* | 9/2008 | Tapsell | G06Q 20/045 |
| | | | 705/65 |
| 2012/0254619 A1* | 10/2012 | Dhuse | H04L 9/0894 |
| | | | 713/176 |
| 2013/0166907 A1* | 6/2013 | Brown | H04L 9/3265 |
| | | | 713/156 |
| 2013/0346743 A1* | 12/2013 | Dixon | H04L 9/3247 |
| | | | 713/156 |
| 2015/0082024 A1* | 3/2015 | Smith | H04L 67/1095 |
| | | | 713/155 |
| 2016/0127132 A1* | 5/2016 | Lee | H04W 12/0023 |
| | | | 713/156 |
| 2017/0012780 A1* | 1/2017 | Kaliski, Jr. | H04L 61/305 |
| 2017/0026177 A1* | 1/2017 | Pilcher | H04L 9/0861 |
| 2017/0249622 A1* | 8/2017 | Ortiz | G06Q 20/387 |
| 2017/0338967 A1* | 11/2017 | Lewison | H04L 9/14 |
| 2018/0006826 A1* | 1/2018 | Smith | H04L 9/30 |
| 2018/0139056 A1* | 5/2018 | Imai | H04L 9/3236 |
| 2018/0227293 A1* | 8/2018 | Uhr | G06Q 20/3821 |
| 2018/0288052 A1* | 10/2018 | Sambandam | H04L 9/3234 |
| 2019/0028281 A1* | 1/2019 | Turissini | G09C 1/00 |
| 2019/0036712 A1* | 1/2019 | Qiu | H04L 9/3268 |
| 2019/0065733 A1* | 2/2019 | Forehand | H04L 9/08 |
| 2019/0075099 A1* | 3/2019 | Brouchier | H04L 63/166 |
| 2019/0096021 A1* | 3/2019 | Jarvis | G06F 21/34 |
| 2019/0132309 A1* | 5/2019 | Wei | H04L 63/126 |
| 2019/0140848 A1* | 5/2019 | Dontov | H04L 63/0823 |
| 2019/0207912 A1* | 7/2019 | Nielson | H04L 9/0877 |
| 2019/0287105 A1* | 9/2019 | Fedorov | H04L 9/08 |
| 2019/0327224 A1* | 10/2019 | Zhang | H04L 63/101 |
| 2019/0333058 A1* | 10/2019 | Hong | G06Q 20/3829 |
| 2019/0364042 A1* | 11/2019 | Liu | H04L 63/0869 |
| 2019/0378142 A1* | 12/2019 | Darnell | G06Q 20/40145 |
| 2020/0012527 A1* | 1/2020 | Hartsock | G06F 9/45558 |
| 2020/0074464 A1* | 3/2020 | Trevethan | H04L 9/0637 |
| 2020/0213085 A1* | 7/2020 | Fletcher | G06Q 20/3829 |

FOREIGN PATENT DOCUMENTS

| | | |
|---|---|---|
| CN | 103701792 | 4/2014 |
| CN | 103856478 | 6/2014 |
| CN | 110401539 | 11/2019 |

OTHER PUBLICATIONS

Nakamoto, "Bitcoin: A Peer-to-Peer Electronic Cash System," www.bitcoin.org, 2005, 9 pages.

International Search Report and Written Opinion in PCT Appln. No. PCT/CN2020/071978, dated Apr. 14, 2020, 9 pages (full machine translation).

* cited by examiner

IDENTITY VERIFICATION

CROSS-REFERENCE TO RELATED APPLICATIONS

This application is a continuation of PCT Application No. PCT/CN2020/071978, filed on Jan. 14, 2020, which claims priority to Chinese Patent Application No. 201910670766.3, filed on Jul. 24, 2019, and each application is hereby incorporated by reference in its entirety.

TECHNICAL FIELD

The present specification belongs to the field of computer technologies, and in particular, relates to methods, servers, terminals, and systems for data processing in identity verification.

BACKGROUND

With development of computer and Internet technologies, different devices or terminals often need to communicate with each other to complete corresponding tasks. For some services, identity verification needs to be performed on communications devices to ensure data communication security.

In the existing technology, identity verification is usually performed by using a digital certificate. For example, multiple network entities (devices, persons, etc.) can each apply to a certificate authority (CA) for a digital certificate, and when the network entities communicate with each other, the network entities can verify their identities by using digital certificates. However, there is security risk when using a digital certificate: a private key is most important in the digital certificate, and the private key is a unique secret representing a user identity, and an attacker can impersonate the user identity once the private key is obtained or maliciously used by the attacker, resulting in an inaccurate identity verification result.

SUMMARY

An objective of implementations of the present specification is providing methods, servers, terminals, and systems for data processing in identity verification, to reduce workload and identity verification difficulty of a verification terminal during identity verification, and improve identity verification efficiency.

According to a first aspect, an implementation of the present specification provides a method for data processing in identity verification, including: verifying a digital identity of a to-be-verified terminal; if the verification on the digital identity of the to-be-verified terminal succeeds, verifying whether the to-be-verified terminal is in a trusted state by using a remote attestation technology; and if it is verified that the to-be-verified terminal is in the trusted state, issuing a digital certificate including a trusted identifier to the to-be-verified terminal, so that a verification terminal performs identity verification on the to-be-verified terminal based on the digital certificate including the trusted identifier.

According to a second aspect, the present specification provides a method for data processing in identity verification, including: obtaining a digital certificate of a to-be-verified terminal; verifying the digital certificate of the to-be-verified terminal; and verifying whether the digital certificate includes a trusted identifier if the verification on the digital certificate of the to-be-verified terminal succeeds, and determining that an identity of the to-be-verified terminal is valid if the digital certificate includes the trusted identifier, where the trusted identifier is in a digital certificate issued by a trusted server to the to-be-verified terminal after verification on both a digital identity and a trusted state of the to-be-verified terminal succeeds.

According to a third aspect, an implementation of the present specification provides a method for data processing in identity verification, including: receiving a digital identity verification request sent by a trusted server; receiving a remote attestation request sent by the trusted server after digital identity verification succeeds, and sending a measurement value to the trusted server, so that the trusted server compares the measurement value with a corresponding reference value stored in the trusted server; receiving a digital certificate including a trusted identifier issued by the trusted server, where the digital certificate including the trusted identifier is issued by the trusted server after the trusted server determines that the measurement value is the same as the reference value; and receiving an identity verification request from a verification terminal, and sending the digital certificate including the trusted identifier to the verification terminal, so that the verification terminal performs identity verification based on the digital certificate including the trusted identifier.

According to a fourth aspect, an implementation of the present specification provides a method for data processing in identity verification, including: verifying a digital identity of a to-be-verified terminal; and issuing a digital certificate including a reference value of the to-be-verified terminal to the to-be-verified terminal if the verification on the digital identity of the to-be-verified terminal succeeds, so that a verification terminal performs identity verification on the to-be-verified terminal based on the digital certificate including the reference value.

According to a fifth aspect, an implementation of the present specification provides a method for data processing in identity verification, including: obtaining a digital certificate of a to-be-verified terminal, where the digital certificate includes a reference value of the to-be-verified terminal, and the reference value is included in a digital certificate issued by a trusted server to the to-be-verified terminal after the trusted server verifies that a digital identity of the to-be-verified terminal is valid; verifying the digital certificate of the to-be-verified terminal; obtaining a measurement value of the to-be-verified terminal by using a remote attestation technology if the verification on the digital certificate of the to-be-verified terminal succeeds; and comparing the measurement value with the reference value in the digital certificate to determine a trusted state of the to-be-verified terminal, thereby completing identity verification on the to-be-verified terminal.

According to a sixth aspect, an implementation of the present specification provides a method for data processing in identity verification, including: receiving a digital identity verification request sent by a trusted server; receiving a digital certificate including a reference value issued by the trusted server after digital identity verification succeeds; receiving an identity verification request from a verification terminal, and sending the digital certificate including the reference value to the verification terminal, so that the verification terminal verifies whether the digital certificate is valid; and receiving a remote attestation request sent by the verification terminal after the verification terminal determines that the digital certificate is valid, and sending a measurement value to the verification terminal, so that the verification terminal performs identity verification based on the measurement value and the reference value in the digital certificate.

According to a seventh aspect, an implementation of the present specification provides a trusted server for data processing in identity verification, including: a first digital identity verification module, configured to verify a digital identity of a to-be-verified terminal; a first trusted state verification module, configured to: if the verification on the digital identity of the to-be-verified terminal succeeds, verify whether the to-be-verified terminal is in a trusted state by using a remote attestation technology; and a trusted certificate issuing module, configured to: if it is verified that the to-be-verified terminal is in the trusted state, issue a digital certificate including a trusted identifier to the to-be-verified terminal, so that a verification terminal performs identity verification on the to-be-verified terminal based on the digital certificate including the trusted identifier.

According to an eighth aspect, an implementation of the present specification provides a verification terminal for data processing in identity verification, including: a first digital certificate acquisition module, configured to obtain a digital certificate of a to-be-verified terminal; a certificate verification module, configured to verify the digital certificate of the to-be-verified terminal; and a trusted identifier verification module, configured to verify whether the digital certificate includes a trusted identifier when the verification on the digital certificate of the to-be-verified terminal succeeds, and determine that an identity of the to-be-verified terminal is valid if the digital certificate includes the trusted identifier, where the trusted identifier is in a digital certificate issued by a trusted server to the to-be-verified terminal after verification on both a digital identity and a trusted state of the to-be-verified terminal succeeds.

According to a ninth aspect, an implementation of the present specification provides a to-be-verified terminal for data processing in identity verification, including: a first verification request receiving module, configured to receive a digital identity verification request sent by a trusted server; a remote attestation module, configured to receive a remote attestation request sent by the trusted server after digital identity verification succeeds, and send a measurement value to the trusted server, so that the trusted server compares the measurement value with a corresponding reference value stored in the trusted server; a trusted certificate receiving module, configured to receive a digital certificate including a trusted identifier issued by the trusted server, where the digital certificate including the trusted identifier is issued by the trusted server after the trusted server determines that the measurement value is the same as the reference value; and a first certificate sending module, configured to receive an identity verification request from a verification terminal, and send the digital certificate including the trusted identifier to the verification terminal, so that the verification terminal performs identity verification based on the digital certificate including the trusted identifier.

According to a tenth aspect, an implementation of the present specification provides a trusted server for data processing in identity verification, including: a second digital identity verification module, configured to verify a digital identity of a to-be-verified terminal by verifying a digital certificate of the to-be-verified terminal, where the digital certificate is obtained by the to-be-verified terminal by applying to a certificate authority; and a reference value certificate issuing module, configured to issue a digital certificate including a reference value of the to-be-verified terminal to the to-be-verified terminal if the verification on the digital identity of the to-be-verified terminal succeeds, so that a verification terminal performs identity verification on the to-be-verified terminal based on the digital certificate including the reference value.

According to an eleventh aspect, an implementation of the present specification provides a verification terminal for data processing in identity verification, including: a second digital certificate acquisition module, configured to obtain a digital certificate of a to-be-verified terminal, where the digital certificate includes a reference value of the to-be-verified terminal, and the reference value is included in a digital certificate issued by a trusted server to the to-be-verified terminal after the trusted server verifies that a digital identity of the to-be-verified terminal is valid; a third digital identity verification module, configured to verify the digital certificate of the to-be-verified terminal; a measurement value acquisition module, configured to obtain a measurement value of the to-be-verified terminal by using a remote attestation technology if the verification on the digital certificate of the to-be-verified terminal succeeds; and a second trusted state verification module, configured to compare the measurement value with the reference value in the digital certificate to determine a trusted state of the to-be-verified terminal, thereby completing identity verification on the to-be-verified terminal.

According to a twelfth aspect, an implementation of the present specification provides a to-be-verified terminal for data processing in identity verification, including: a second verification request receiving module, configured to receive a digital identity verification request sent by a trusted server; a reference certificate receiving module, configured to receive a digital certificate including a reference value issued by the trusted server after digital identity verification succeeds; a second certificate sending module, configured to receive an identity verification request from a verification terminal, and send the digital certificate including the reference value to the verification terminal, so that the verification terminal verifies whether the digital certificate is valid; and a measurement value sending module, configured to receive a remote attestation request sent by the verification terminal after the verification terminal determines that the digital certificate is valid, and send a measurement value to the verification terminal, so that the verification terminal performs identity verification based on the measurement value and the reference value in the digital certificate.

According to a thirteenth aspect, the present specification provides a device for data processing in identity verification, including: at least one processor and a memory configured to store a processor-executable instruction, where the processor implements the previously described method for data processing in identity verification when executing the instruction.

According to a fourteenth aspect, an implementation of the present specification provides a system for data processing in identity verification, including: a trusted service center, at least one verified terminal, and at least one verification terminal, where the trusted service center stores reference values of different terminals, a trusted computing chip is configured in the to-be-verified terminal, and the to-be-verified terminal has applied for a digital certificate; the trusted service center includes at least one processor and a memory configured to store a processor-executable instruction, where the processor implements the method according to the first aspect or the fourth aspect when executing the instruction; the to-be-verified terminal includes at least one processor and a memory configured to store a processor-executable instruction, where the processor implements the method according to the third aspect or the sixth aspect when executing the instruction; and the verification terminal includes at least one processor and a memory configured to store a processor-executable instruction, where the processor implements the method according to the second aspect or the fifth aspect when executing the instruction.

According to the data processing methods, the apparatuses, the devices, and the systems for identity verification provided in the present specification, digital identity verification is used in combination with a trusted computing technology to perform identity verification, and the trusted service center is configured to perform pre-verification on the to-be-verified terminal. After verification on both the digital identity and the trusted state of the to-be-verified terminal succeeds, the trusted identifier is added to the digital certificate of the to-be-verified terminal, so that the verification terminal can directly verify both the digital identity of the to-be-verified terminal and the trusted state of the device based on the digital certificate including the trusted identifier. In addition, the verification terminal does not need to be capable of parsing a trusted protocol, and only needs to verify the trusted identifier in the digital certificate. Compared with a solution in which a digital certificate and a trusted computing technology are separately used, in the method provided in the implementations of the present specification, only the digital certificate needs to be parsed without obtaining a reference value or parsing a remote attestation protocol, so that engineering implementation is easier, thereby reducing workload and identity verification difficulty of the verification terminal, and improving identity verification efficiency.

BRIEF DESCRIPTION OF DRAWINGS

To describe technical solutions in implementations of the present specification or in the existing technology more clearly, the following briefly describes the accompanying drawings required for describing the implementations or the existing technology. Clearly, the accompanying drawings in the following description merely show some implementations described in the present specification, and a person of ordinary skill in the art can still derive other drawings from these accompanying drawings without creative efforts.

DESCRIPTION OF IMPLEMENTATIONS

Figure 1:
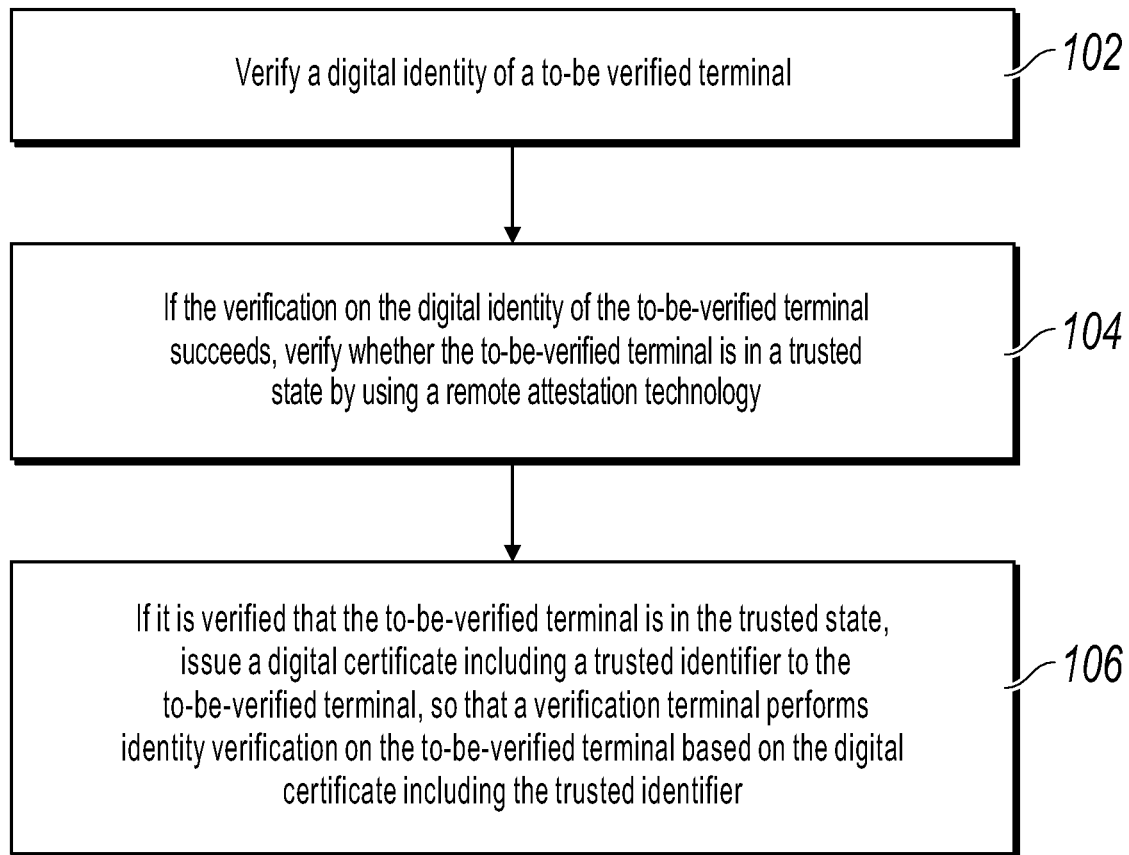
FIG. 1 is a schematic flowchart illustrating a method for data processing in identity verification, according to an implementation of the present specification.

To make a person skilled in the art better understand the technical solutions in the present specification, the following clearly and comprehensively describes the technical solutions in the implementations of the present specification with reference to the accompanying drawings in the implementations of the present specification. Clearly, the described implementations are merely some rather than all of the implementations of the present specification. All other implementations obtained by a person of ordinary skill in the art based on the implementations of the present specification without creative efforts shall fall within the protection scope of the present specification.

A digital certificate in the implementations of the present specification is a sequence of numbers used to attest a user identity. The digital certificate usually includes a digital signature of a certificate authority (CA), and any user can verify validity of the certificate by using the signature. Users can include network entities such as device terminals or persons using the device terminals. The two most important fields in the digital certificate are usually a user name and a user public key, and other persons can verify behavior of a user in a digital network by using a public key. The CA can represent a digital certificate issuing institution, namely, a certificate authority. Before issuing a digital certificate to a user, the CA needs to verify an identity of the user, to ensure that the certificate is delivered to a correct person.

A remote attestation technology in the implementations of the present specification is a part of a trusted computing technology. Trusted computing can indicate that integrity of entire host system software is ensured by gradually verifying software integrity from bottom to up. A trusted computing chip (such as a trusted platform module (TPM) or a trusted platform control module (TPCM), generally referred to as a TPM abroad and generally referred to as a TPCM in China) can be configured in a to-be-verified terminal. To establish a trust relationship between a remote host and a local host, a digital certificate and a private key are usually predetermined in the trusted computing chip at delivery. When the remote host and the local host interact with each other, the local host signs a measurement value of software by using the predetermined digital certificate, and the remote host trusts the measurement value after verifying validity of the certificate and the signature. Remote attestation can indicate that a running state of the local software is attested to the remote host. The running state here mainly refers to the measurement value of the software. The measurement value can represent a result (a sequence of numbers) of measuring a program. For example, a result of performing a hash operation on an executable file of the program can be used as a measurement value of the program. Certainly, other methods can be used to perform calculation processing on the program or a device to obtain a calculation result as a measurement value of the program or the device. A correct measurement value can be called a reference value. Generally, in the remote attestation technology, the measurement value of the program is compared with the reference value, and the program may have been tampered with if the measurement value of the program is different from the reference value. It can be considered that a device whose measurement value and reference value are the same is in a trusted state; otherwise, the device is in an untrusted state.

In the implementations of the present specification, digital identity verification is used in combination with the trusted computing technology to verify an identity of a terminal, and a trusted service center is configured to perform pre-verification on a to-be-verified terminal. After verification on both a digital identity and a trusted state of the to-be-verified terminal succeeds, a trusted identifier is added to a digital certificate issued to the to-be-verified terminal, so that a verification terminal can directly verify both the digital identity of the to-be-verified terminal and the trusted state of the device based on the digital certificate including the trusted identifier. In addition, the verification terminal does not need to be capable of parsing a trusted protocol, and only needs to verify the trusted identifier in the digital certificate, which reduces workload and identity verification difficulty of the verification terminal, and improves identity verification efficiency.

The method for data processing in identity verification in the present specification can be applied to a client or a server. The client can be an electronic device such as a smartphone, a tablet computer, an intelligent wearable device (a smart watch, virtual reality glasses, a virtual reality helmet, etc.), or an intelligent vehicle-mounted device, etc.

FIG. 1 is a schematic flowchart illustrating a method for data processing in identity verification, according to an implementation of the present specification. As shown in FIG. 1, the method for data processing in identity verification provided in this implementation of the present specification can be applied to a trusted service center. The trusted service center is a trusted server in this implementation of the present specification, and can be specifically one server, or a server cluster including multiple servers. As shown in FIG. 1, the trusted service center can perform the following method in an identity verification process.

Step 102: Verify a digital identity of a to-be-verified terminal.

Figure 2:
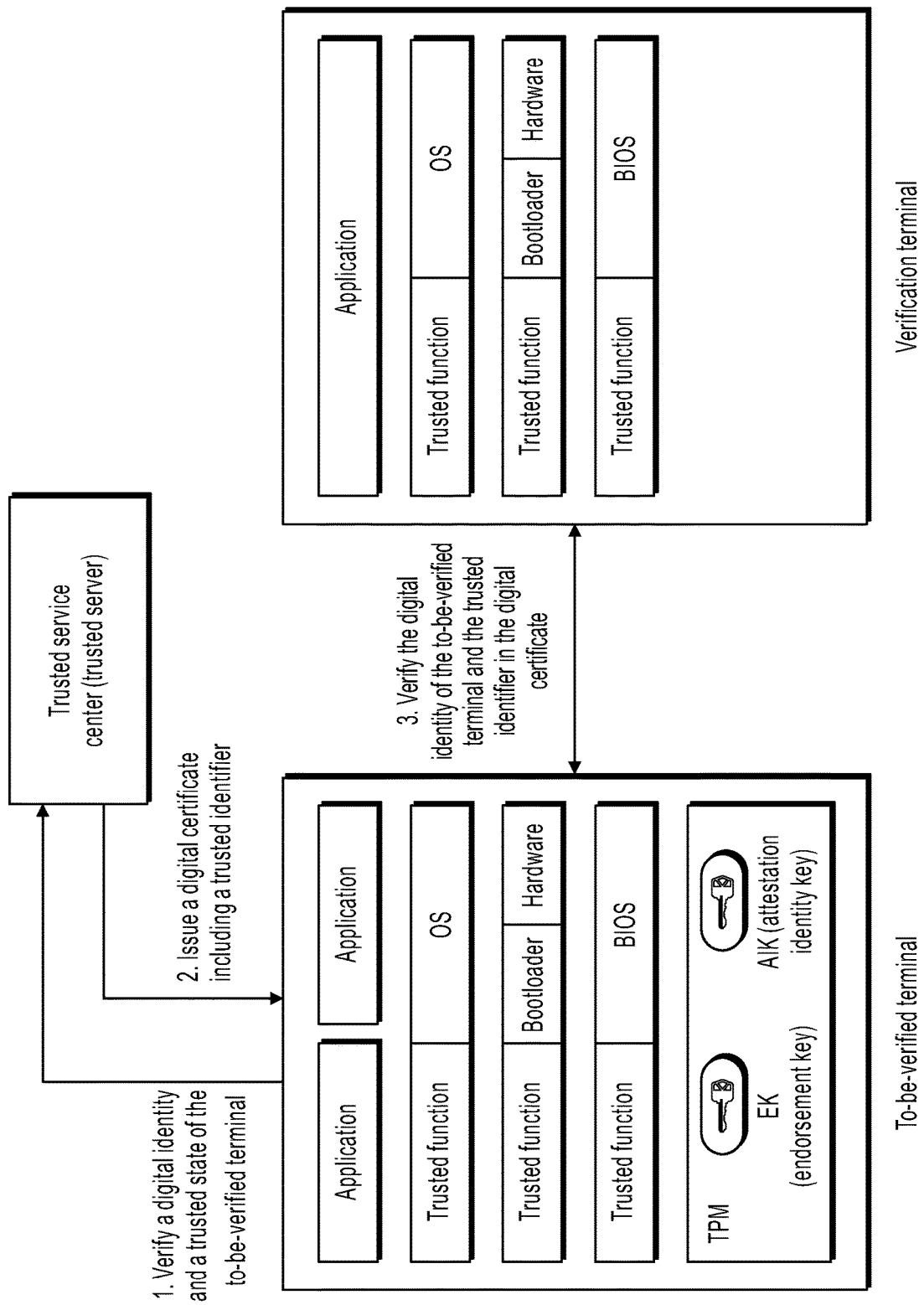
FIG. 2 is a block diagram illustrating a method for data processing in identity verification, according to another implementation of the present specification.

FIG. 2 is a block diagram illustrating a method for data processing in identity verification, according to another implementation of the present specification. As shown in FIG. 2, a system for data processing in identity verification in this implementation of the present specification can include a trusted service center (namely, a trusted server described in this implementation of the present specification), a to-be-verified terminal, and a verification terminal. The trusted service center can be configured to verify a digital identity and a trusted state of a network entity such as a to-be-verified terminal or a verification terminal. In this implementation of the present specification, the to-be-verified terminal can represent a network entity that another terminal performs identity verification on, and the verification terminal can represent a network entity that performs identity verification on an identity of a to-be-verified terminal. The verification terminal and the to-be-verified terminal can be clients or servers. Implementations are not specifically limited in this implementation of the present specification.

In a specific implementation process, before the verification terminal performs identity verification on the to-be-verified terminal, the trusted service center can first perform identity verification on the to-be-verified terminal. First, the trusted service center can verify the digital identity of the to-be-verified terminal. The digital identity can represent an identity identifier of the network entity. The digital identity of the to-be-verified terminal is verified, so that it can be determined whether an identity of the to-be-verified terminal is valid. For example, the digital identity of the to-be-verified terminal can be verified by using a public-private key pair, a password, or a digital certificate. The verification method can be specifically selected based on actual demands, and is not specifically limited in this implementation of the present specification. For example, the trusted service center can require the to-be-verified terminal to sign by using a private key of the to-be-verified terminal, and the trusted service center verifies signed data by using a public key of the to-be-verified terminal, to determine whether the digital identity of the to-be-verified terminal is valid.

In some implementations of the present specification, the to-be-verified terminal can apply to a CA, namely, a certificate authority, for a digital certificate of the to-be-verified terminal in advance. The digital certificate can include information such as the public key of the to-be-verified terminal and a user name of the to-be-verified terminal. A specific method for applying for a digital certificate and a specific method for issuing a digital certificate can be selected based on actual demands, and are not specifically limited in this implementation of the present specification. Before the verification terminal verifies the identity of the to-be-verified terminal, the trusted service center can verify the digital identity of the to-be-verified terminal by verifying the digital certificate of the to-be-verified terminal.

For example, the trusted service center can request the to-be-verified terminal to send the digital certificate of the to-be-verified terminal to the trusted service center. After obtaining the digital certificate of the to-be-verified terminal, the trusted service center can verify whether the digital certificate is valid, for example, verify whether the digital certificate is issued by a CA, and check a certificate validity period or a CA revocation list to check whether the certificate expires or is revoked. Then, the trusted service center can send a random number to the to-be-verified terminal, to request the to-be-verified terminal to sign the random number by using the private key of the to-be-verified terminal. The trusted service center verifies the digital signature by using a public key in the digital certificate, to verify whether the to-be-verified terminal has a private key corresponding to the digital certificate, thereby verifying the digital identity of the to-be-verified terminal. Certainly, based on actual demands, the trusted service center can use other methods to verify the digital identity of the to-be-verified terminal by verifying the digital certificate of the to-be-verified terminal. Implementations are not specifically limited in this implementation of the present specification.

Step 104: If the verification on the digital identity of the to-be-verified terminal succeeds, verify whether the to-be-verified terminal is in a trusted state by using a remote attestation technology.

In a specific implementation process, the trusted service center considers that the verification on the digital identity of the to-be-verified terminal succeeds. For example, the trusted service center verifies the digital certificate of the to-be-verified terminal, and if the digital certificate of the to-be-verified terminal is issued by the CA and the to-be-verified terminal has the private key corresponding to the digital certificate, the trusted service center can consider that the verification on the digital identity of the to-be-verified terminal succeeds, and then can verify a trusted state of the to-be-verified terminal by using the remote attestation technology. The remote attestation technology is a process of a trusted computing technology. In a specific implementation process, as shown in FIG. 2, a trusted computing chip (TPM) can be configured in the to-be-verified terminal, and the digital certificate and the private key of the to-be-verified terminal are predetermined in the trusted computing chip at delivery. The trusted service center can obtain and store reference values of multiple terminals including the to-be-verified terminal in advance. A specific method for obtaining a reference value can be selected based on actual demands, and is not specifically limited in this implementation of the present specification.

When verifying the trusted state of the to-be-verified terminal, the trusted service center can request to obtain a measurement value of the to-be-verified terminal by using the remote attestation technology. The to-be-verified terminal can sign the measurement value of the to-be-verified terminal by using the digital certificate and the private key in the trusted computing chip, and then send the measurement value to the trusted service center. The trusted service center can verify the signed data, and trust the measurement value after verifying that both the digital certificate and the signature are valid; compare the measurement value with a reference value of the to-be-verified terminal stored in the trusted service center; and consider that the to-be-verified terminal in the trusted state if the measurement value is the same as the reference value. For meanings of the measurement value and the reference value, references can be made to the description in the previous implementations. Details are omitted here for simplicity.

Step 106: If it is verified that the to-be-verified terminal is in the trusted state, issue a digital certificate including a trusted identifier to the to-be-verified terminal, so that the verification terminal performs identity verification on the to-be-verified terminal based on the digital certificate including the trusted identifier.

In a specific implementation process, after verifying that the to-be-verified terminal is in the trusted state, the trusted service center can issue the digital certificate including the trusted identifier to the to-be-verified terminal. The trusted identifier can be a character or a character string used to identify that the to-be-verified terminal is in the trusted state. The trusted identifier can be specifically a number or other characters, and is not specifically limited in this implementation of the present specification. The trusted service center can include a certificate authority, namely, a CA. After verification on both the digital identity and the trusted state of the to-be-verified terminal succeeds, the trusted service center can issue the digital certificate including the trusted identifier to the to-be-verified terminal by using the CA. If the to-be-verified terminal has applied to a CA for a digital certificate, the trusted service center verifies the digital identity of the to-be-verified terminal by verifying the digital certificate of the to-be-verified terminal. In this case, after verification on both the digital identity and the trusted state of the to-be-verified terminal succeeds, the trusted service center can directly add the trusted identifier to the digital certificate of the to-be-verified terminal, and send, to the to-be-verified terminal, the digital certificate that the trusted identifier is added to. In some implementations of the present specification, the trusted identifier can be predetermined in an extended field of the digital certificate, to label the trusted state of the to-be-verified terminal without damaging the original digital certificate.

When the verification terminal needs to perform identity verification on the to-be-verified terminal before communicating the to-be-verified terminal, the verification terminal can obtain the digital certificate of the to-be-verified terminal, can verify the digital identity of the to-be-verified terminal by verifying the digital certificate of the to-be-verified terminal, and can further verify the trusted identifier in the digital certificate of the to-be-verified terminal after the verification on the digital identity succeeds, to determine whether the to-be-verified terminal is safe and trusted.

For example, after verifying that a digital identity of verified terminal A is valid and verified terminal A is in a trusted state, the trusted service center can issue a digital certificate including a trusted identifier to verified terminal A. When verification terminal B needs to perform identity verification on verified terminal A before performing data communication with verified terminal A, verification terminal B can first obtain the digital certificate of verified terminal A, and verify the digital identity of verified terminal A by using the digital certificate. For a specific verification process, references can be made to a process in which the trusted service center verifies the digital identity of the to-be-verified terminal A. Details are omitted here for simplicity. After the verification on the digital identity of verified terminal A succeeds, verification terminal B can verify the trusted identifier in the digital certificate of verified terminal A, to determine whether verified terminal A is in the trusted state. For example, verification terminal B can consider that verified terminal A is trusted if the digital certificate of verified terminal A includes the trusted identifier; or verification terminal B can consider that verified terminal A is trusted if the trusted identifier in the digital certificate of verified terminal A satisfies a predetermined trusted standard. After completing the identity verification on verified terminal A, verification terminal B can perform data communication with verified terminal A.

A digital certificate issued by applying to a CA usually has a relatively long validity period, for example, one year or three years. In some implementations of the present specification, a validity period of the digital certificate including the trusted identifier can be set when the digital certificate including the trusted identifier is issued to the to-be-verified terminal, and the set validity period is usually relatively short, for example, can be one day, three days, seven days, or one month. Different times can be specifically set based on actual demands. Therefore, the to-be-verified terminal that is verified by the trusted service center to be in the trusted state can be prevented from becoming untrustworthy when being invaded or tampered with after running for a period of time, affecting system security. The trusted service center can verify the to-be-verified terminal at an interval of a specified period to verify whether the trusted identifier of the to-be-verified terminal is valid; and if the trusted identifier of the to-be-verified terminal is invalid, the trusted service center can verify the digital identity and the trusted state of the to-be-verified terminal again, and issue a new digital certificate including a trusted identifier. Alternatively, when the trusted identifier of the to-be-verified terminal becomes invalid, the trusted service center can verify the digital identity and the trusted state of the to-be-verified terminal again, and issue a new digital certificate including a trusted identifier.

In this implementation of the present specification, the validity period of the digital certificate including the trusted identifier is set, so that time validity of the trusted state of the to-be-verified terminal can be improved, thereby improving identity verification accuracy and further improving system security.

According to the method for data processing in identity verification provided in this implementation of the present specification, digital identity verification is used in combination with the trusted computing technology to perform identity verification, and the trusted service center is configured to perform pre-verification on the to-be-verified terminal. After verification on both the digital identity and the trusted state of the to-be-verified terminal succeeds, the trusted identifier is added to the digital certificate of the to-be-verified terminal, so that the verification terminal can directly verify both the digital identity of the to-be-verified terminal and the trusted state of the device based on the digital certificate including the trusted identifier. In addition, the verification terminal does not need to be capable of parsing a trusted protocol, and only needs to verify the trusted identifier in the digital certificate. Compared with a solution in which a digital certificate and a trusted computing technology are separately used, in the method provided in this implementation of the present specification, only the digital certificate needs to be parsed without obtaining a reference value or parsing a remote attestation protocol, so that engineering implementation is easier, thereby reducing workload and identity verification difficulty of the verification terminal, and improving identity verification efficiency.

Figure 3:
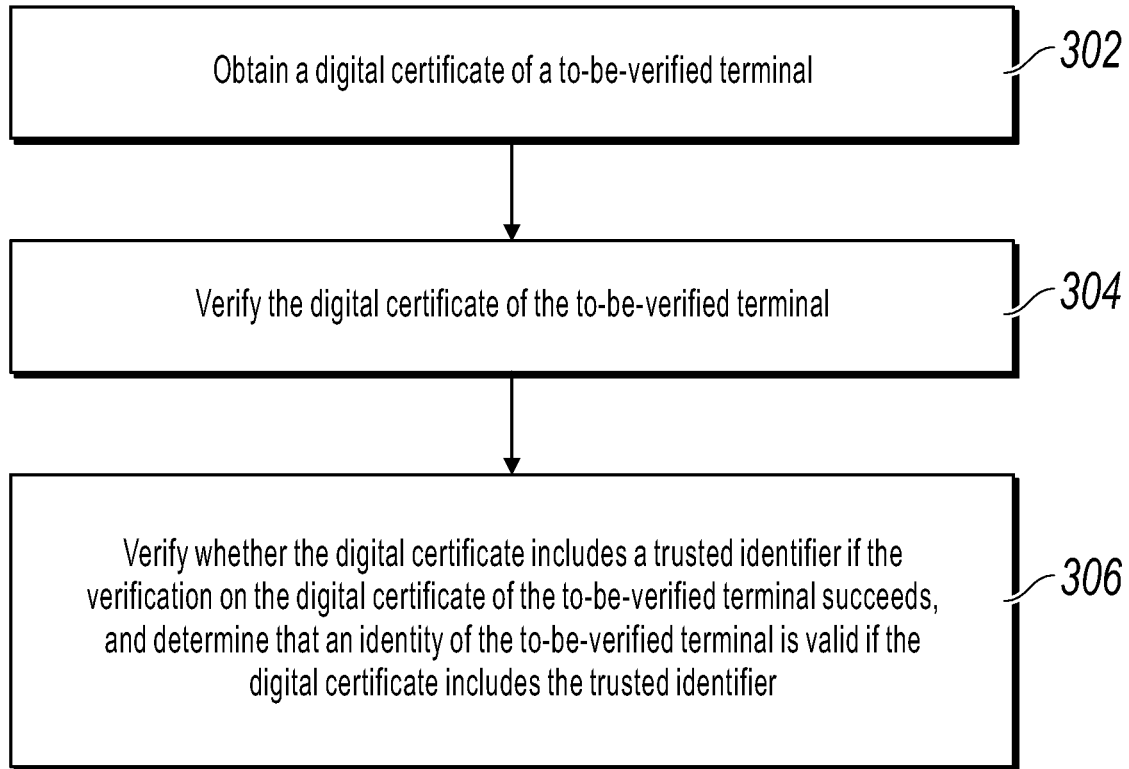
FIG. 3 is a schematic flowchart illustrating a method for data processing in identity verification performed by a verification terminal, according to an implementation of the present specification.

FIG. 3 is a schematic flowchart illustrating a method for data processing in identity verification performed by a verification terminal, according to an implementation of the present specification. As shown in FIG. 3, when performing data processing in identity verification, the verification terminal can perform the following method.

Step 302: Obtain a digital certificate of a to-be-verified terminal.

In a specific implementation process, when the verification terminal needs to perform identity verification on the to-be-verified terminal before performing data communication with the to-be-verified terminal to ensure data communication security, the verification terminal can request to obtain the digital certificate of the to-be-verified terminal. The digital certificate of the to-be-verified terminal can be a digital certificate that is applied for by the to-be-verified terminal to a CA and that is issued by the CA, or can be a digital certificate including a trusted identifier issued by a trusted service center after verification on both a digital identity and a trusted state of the to-be-verified terminal succeeds.

Step 304: Verify the digital certificate of the to-be-verified terminal.

After obtaining the digital certificate of the to-be-verified terminal, the verification terminal can verify whether the digital certificate is valid, for example, verify whether the digital certificate is issued by a CA, and check a certificate validity period or a CA revocation list to check whether the certificate expires or is revoked. Then, the verification terminal can send a random number to the to-be-verified terminal, to request the to-be-verified terminal to sign the random number by using a private key of the to-be-verified terminal, and the verification terminal can verify the digital signature by using a public key in the digital certificate, to verify whether the to-be-verified terminal has a private key corresponding to the digital certificate, thereby verifying the digital identity of the to-be-verified terminal. Certainly, based on actual demands, the verification terminal can use other methods to verify the digital identity of the to-be-verified terminal by verifying the digital certificate of the to-be-verified terminal. Implementations are not specifically limited in this implementation of the present specification.

Step 306: Verify whether the digital certificate includes a trusted identifier if the verification on the digital certificate of the to-be-verified terminal succeeds, and determine that an identity of the to-be-verified terminal is valid if the digital certificate includes the trusted identifier.

The trusted identifier is in a digital certificate issued by a trusted server to the to-be-verified terminal after verification on both the digital identity and the trusted state of the to-be-verified terminal succeeds.

In a specific implementation process, after determining that the digital certificate of the to-be-verified terminal is valid and the verification on the digital identity of the to-be-verified terminal succeeds, the verification terminal can verify the trusted identifier in the digital certificate of the to-be-verified terminal, to determine whether the to-be-verified terminal is in a trusted state. For example, the verification terminal can consider that the to-be-verified terminal is trusted if the digital certificate of the to-be-verified terminal includes the trusted identifier; or the verification terminal can consider that the to-be-verified terminal is trusted if the trusted identifier in the digital certificate of the to-be-verified terminal satisfies a predetermined trusted standard. After completing the identity verification on the to-be-verified terminal, the verification terminal can perform data communication with the to-be-verified terminal.

According to the method for data processing in identity verification in this implementation of the present specification, the trusted service center is configured to perform pre-verification on the to-be-verified terminal. After verification on both the digital identity and the trusted state of the to-be-verified terminal succeeds, the trusted identifier is added to the digital certificate of the to-be-verified terminal, so that the verification terminal can directly verify both the digital identity of the to-be-verified terminal and the trusted state of the device based on the digital certificate including the trusted identifier. In addition, the verification terminal does not need to be capable of parsing a trusted protocol, and only needs to verify the trusted identifier in the digital certificate. Compared with a solution in which a digital certificate and a trusted computing technology are separately used, in the method provided in this implementation of the present specification, only the digital certificate needs to be parsed without obtaining a reference value or parsing a remote attestation protocol, so that engineering implementation is easier, thereby reducing workload and identity verification difficulty of the verification terminal, and improving identity verification efficiency.

Figure 4:
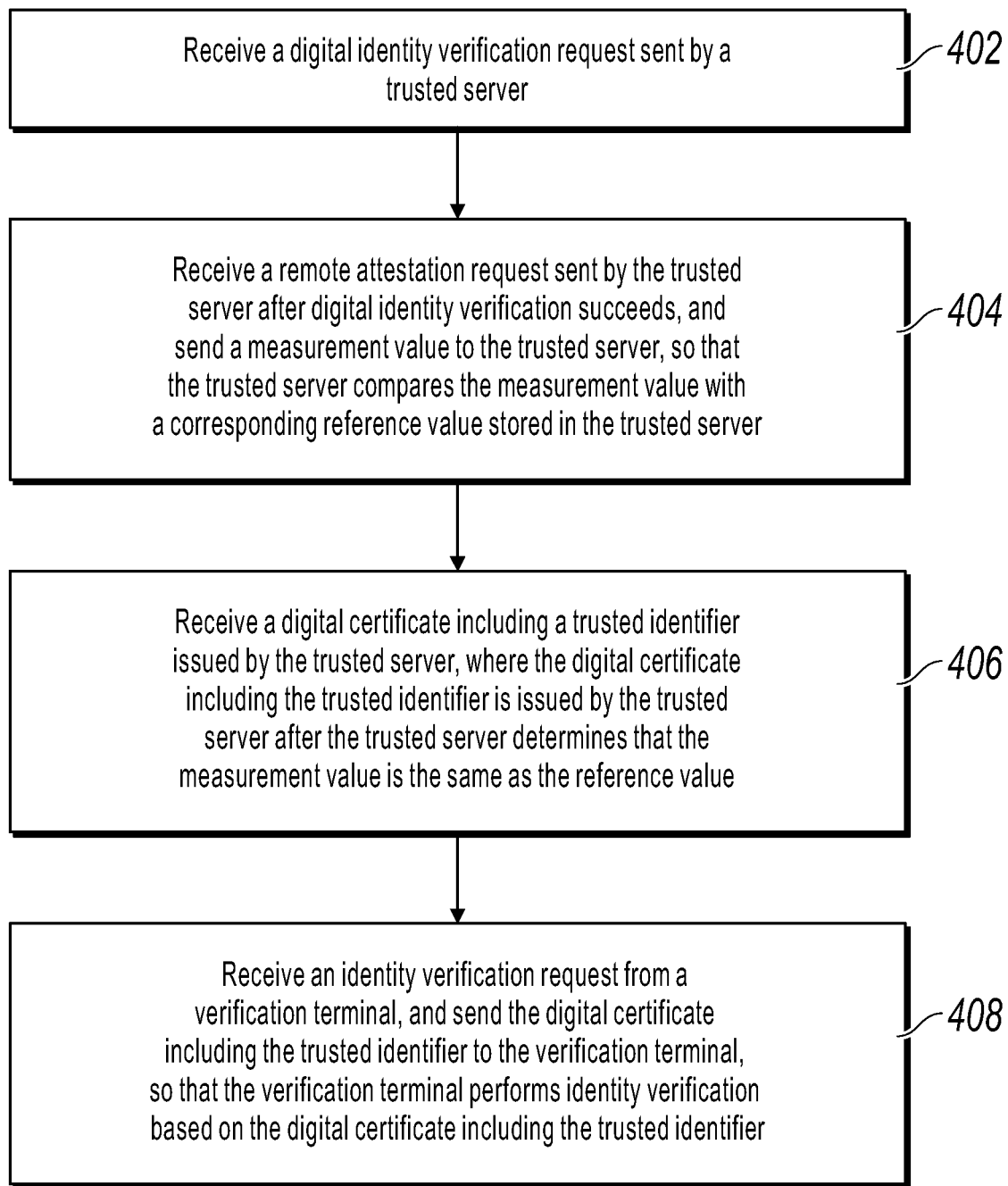
FIG. 4 is a schematic flowchart illustrating a method for data processing in identity verification performed by a to-be-verified terminal, according to an implementation of the present specification.

FIG. 4 is a schematic flowchart illustrating a method for data processing in identity verification performed by a to-be-verified terminal, according to an implementation of the present specification. As shown in FIG. 4, when performing data processing in identity verification, the to-be-verified terminal can perform the following method.

Step 402: Receive a digital identity verification request sent by a trusted server.

In a specific implementation process, before a verification terminal verifies an identity of the to-be-verified terminal, a trusted service center, namely, the trusted server, can first verify a digital identity and a trusted state of the to-be-verified terminal. The trusted service center can send the digital identity verification request to the to-be-verified terminal, and verify the digital identity of the to-be-verified terminal by using a public-private key pair, a password, a digital certificate, etc. For example, the to-be-verified terminal can apply to a CA, namely, a certificate authority, for a digital certificate of the to-be-verified terminal in advance. The digital certificate can include information such as a public key of the to-be-verified terminal and a user name of the to-be-verified terminal. A specific method for applying for a digital certificate and a specific method for issuing a digital certificate can be selected based on actual demands, and are not specifically limited in this implementation of the present specification. When the trusted service center needs to perform previous identity verification on the to-be-verified terminal, the trusted service center can request the to-be-verified terminal to send the digital certificate to the trusted service center. The trusted service center can verify the digital identity of the to-be-verified terminal by verifying the digital certificate of the to-be-verified terminal. For a process in which the trusted service center verifies the digital identity of the to-be-verified terminal, references can be made to the description in the previous implementations. Details are omitted here for simplicity.

Step 404: Receive a remote attestation request sent by the trusted server after digital identity verification succeeds, and send a measurement value to the trusted server, so that the trusted server compares the measurement value with a corresponding reference value stored in the trusted server.

In a specific implementation process, after the verification on the digital identity of the to-be-verified terminal succeeds, the trusted service center, namely, the trusted server, can request to obtain the measurement value of the to-be-verified terminal by using a remote attestation technology. A trusted computing chip can be configured in the to-be-verified terminal, and the digital certificate and a private key of the to-be-verified terminal are predetermined in the trusted computing chip at delivery. After receiving the remote attestation request sent by the trusted service center, the to-be-verified terminal can sign the measurement value of the to-be-verified terminal by using the digital certificate and the private key in the trusted computing chip, and then send the measurement value to the trusted service center. The trusted service center can verify the signed data, and trust the measurement value after verifying that both the certificate and the signature are valid; and compare the measurement value with the reference value of the to-be-verified terminal stored in the trusted service center. The trusted service center can consider that the to-be-verified terminal is in a trusted state if the measurement value is the same as the reference value; or the trusted service center can consider that the to-be-verified terminal is untrusted and may be invaded or tampered with if the measurement value is different from the reference value. For meanings of the measurement value and the reference value, references can be made to the description in the previous implementation. Details are omitted here for simplicity.

Step 406: Receive a digital certificate including a trusted identifier issued by the trusted server, where the digital certificate including the trusted identifier is issued by the trusted server after the trusted server determines that the measurement value is the same as the reference value.

In a specific implementation process, after the trusted service center verifies that the to-be-verified terminal is in the trusted state, that is, the measurement value is the same as the reference value, the trusted service center can issue the digital certificate including the trusted identifier to the to-be-verified terminal, and the to-be-verified terminal can receive the digital certificate including the trusted identifier sent by the trusted server. The trusted service center can add the trusted identifier to an extended field of the digital certificate that the to-be-verified terminal requests the CA to issue, and issue the digital certificate to the to-be-verified terminal as the digital certificate including the trusted identifier. For a specific meaning of the trusted identifier, references can be made to the description in the previous implementations. Details are omitted here for simplicity. Alternatively, the trusted service center can include a CA, and directly issues the digital certificate including the trusted identifier to the to-be-verified terminal after verification on the digital identity and the trusted state of the to-be-verified terminal succeeds.

Step 408: Receive an identity verification request from the verification terminal, and send the digital certificate including the trusted identifier to the verification terminal, so that the verification terminal performs identity verification based on the digital certificate including the trusted identifier.

In a specific implementation process, when the verification terminal needs to perform identity verification on the to-be-verified terminal before communicating with the to-be-verified terminal, the verification terminal can send the identity verification request to the to-be-verified terminal, and after receiving the identity verification request, the to-be-verified terminal can send the digital certificate including the trusted identifier to the verification terminal. The verification terminal can verify the digital identity of the to-be-verified terminal by verifying the received digital certificate, and can further verify the trusted state of the to-be-verified terminal by verifying the trusted identifier in the received digital certificate. For a process in which the verification terminal performs identity verification on the to-be-verified terminal by using the digital certificate including the trusted identifier, references can be made to the description in the previous implementations. Details are omitted here for simplicity.

In addition, in some implementations of the present specification, a private key corresponding to the digital certificate including the trusted identifier (that is, a private key corresponding to a public key in the digital certificate) is stored in a dynamic memory or a trusted computing chip. The dynamic memory can represent a memory whose information is lost if circuit refreshment is not performed at an interval of a period of time, for example, can be a dynamic random access memory (DRAM). Access permission of the digital certificate including the trusted identifier can be set when the private key corresponding to the public key in the digital certificate is stored in the trusted computing chip, and the access permission indicates that the digital certificate including the trusted identifier is allowed to be accessed only by a terminal in a trusted state. The digital certificate (mainly the private key) including the trusted identifier in this implementation of the present specification is not stored for a long period. Even if a device is protected by using a trusted technology, some physical methods can still be used to bypass protection of the trusted technology. If the digital certificate (including the private key corresponding to the digital certificate) including the trusted identifier is stored for a long period, an attacker may obtain the private key by using a physical attack or maliciously use the key. For example, if the digital certificate including the trusted identifier is stored in a hard disk, an attacker may steal a file in the hard disk; or if the digital certificate including the trusted identifier is stored in a chip, an attacker may remove the chip and maliciously invoke the chip on another platform. Even if the digital certificate (including the private key corresponding to the digital certificate) needs to be stored for a long period, the digital certificate needs to be stored after being protected by using a trusted technology. For example, the trusted computing chip can generally provide permission to bind access permission of a key to a trusted state: The key can be accessed only by a device in a trusted state, that is, the device can access the digital certificate and the private key corresponding to the digital certificate only when a measurement value and a reference value of the device are the same, thereby improving security of the private key of the to-be-verified terminal.

According to the method for data processing in identity verification provided in this implementation of the present specification, the trusted service center is configured to perform pre-verification on the to-be-verified terminal. After verification on both the digital identity and the trusted state of the to-be-verified terminal succeeds, the trusted identifier is added to the digital certificate of the to-be-verified terminal, so that the verification terminal can directly verify both the digital identity of the to-be-verified terminal and the trusted state of the device based on the digital certificate including the trusted identifier. In addition, the verification terminal does not need to be capable of parsing a trusted protocol, and only needs to verify the trusted identifier in the digital certificate. Compared with a solution in which a digital certificate and a trusted computing technology are separately used, in the method provided in this implementation of the present specification, only the digital certificate needs to be parsed without obtaining a reference value or parsing a remote attestation protocol, so that engineering implementation is easier, thereby reducing workload and identity verification difficulty of the verification terminal, and improving identity verification efficiency.

With reference to FIG. 2, the following specifically describes a process of the method for data processing in identity verification in the implementations of the present specification. In a to-be-verified terminal and a verification terminal in FIG. 2, OS can represent an operating system, and Bootloader can represent a small program that runs before an operating system kernel runs. By using the small program, a hardware device can be initialized and a memory space mapping diagram can be established, to bring a software and hardware environment of the system to a proper state, thereby preparing a correct environment for finally invoking the operating system kernel. BIOS can represent a basic input output system, and is a group of programs built into a chip on a mainboard inside a computer. A main function of the BIOS is to provide most underlying and most direct hardware setting and control for the computer. As shown in FIG. 2, a trusted computing chip (TPM) is further configured in the to-be-verified terminal, and the trusted computing chip can include an endorsement key (EK) and an attestation identity key (AIK).

In this implementation of the present specification, a trusted service center can be established in a network system, and the trusted service center verifies a digital identity and a trusted state of a network entity, and then issues a digital certificate including a trusted identity to the network entity. The digital certificate including the trusted identifier means that a field is added to the digital certificate to indicate whether a machine state is trusted, and the trusted identifier can be specifically placed in an extended field of the digital certificate. When verifying an identity of the network entity, it is only necessary to first verify the identity of the network entity by using the digital certificate, and then determine the trusted identifier in the digital certificate. As shown in FIG. 2, an identity verification process is as follows:

1. The trusted service center first verifies a digital identity of the to-be-verified terminal (which can be completed by using a common digital certificate), and then verifies a trusted state of the to-be-verified terminal by using a trusted technology (for example, the trusted service center requires the to-be-verified terminal to send a measurement value of the to-be-verified terminal to the trusted service center by using a remote attestation technology, and compares the measurement value with a reference value, to determine whether the to-be-verified terminal is invaded).

2. The trusted service center issues a digital certificate including a trusted identifier to the to-be-verified terminal if verifying that the to-be-verified terminal is in a trusted state.

3. The verification terminal first verifies the digital identity of the to-be-verified terminal by using the digital certificate (for example, the verification terminal requires the to-be-verified terminal to sign by using a private key), and then determines the trusted state of the to-be-verified terminal by determining the trusted identifier in the digital certificate.

In this implementation of the present specification, during identity verification, the following processes need to be noted:

1. Limit a validity period of the digital certificate including the trusted identifier. An originally trusted device may become untrusted after running for a period of time. The trusted state has validity time, so that the validity period of the digital certificate including the trusted identifier should be set to be relatively short.

2. Long-period storage is not recommended for the digital certificate (including a private key corresponding to the digital certificate) including the trusted identifier. Even if a device is protected by using a trusted technology, some physical methods can still be used to bypass protection of the trusted technology. If the digital certificate including the trusted identifier is stored for a long period, an attacker may obtain the private key by using a physical attack or maliciously use the key. For example, if the digital certificate including the trusted identifier is stored in a hard disk, an attacker may steal a file in the hard disk; or if the digital certificate including the trusted identifier is stored in a chip, an attacker may remove the chip and maliciously invoke the chip on another platform. Even if the digital certificate needs to be stored for a long period, the digital certificate needs to be stored after being protected by using a trusted technology. For example, the trusted computing chip generally provides permission to bind access permission of a key to a trusted state: The key can be accessed only by a device in a trusted state.

This implementation of the present specification includes a check on a trusted state of a device, so that a case in which the device is invaded can be discovered. Compared with a solution in which a digital certificate and a trusted computing technology are separately used, in the present solution, the verification terminal only needs to parse the digital certificate without obtaining a reference value or parsing a remote attestation protocol, so that engineering implementation is easier.

Figure 5:
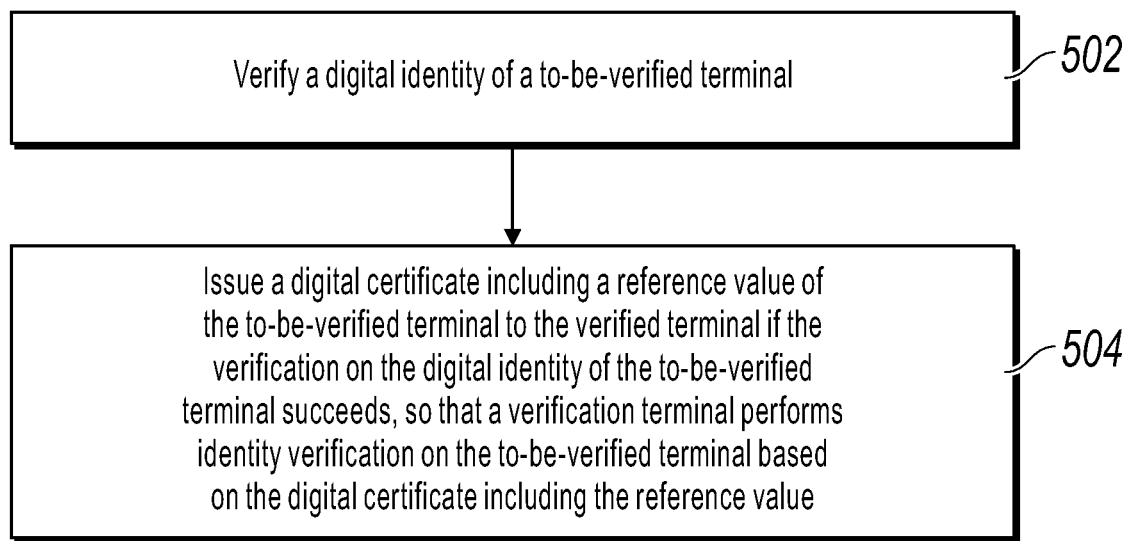
FIG. 5 is a schematic flowchart illustrating a method for data processing in identity verification performed by a trusted service center, according to another implementation of the present specification.

FIG. 5 is a schematic flowchart illustrating a method for data processing in identity verification performed by a trusted service center, according to another implementation of the present specification. As shown in FIG. 5, this implementation of the present specification further provides a method for data processing in identity verification, including the following steps.

Step 502: Verify a digital identity of a to-be-verified terminal.

Figure 6:
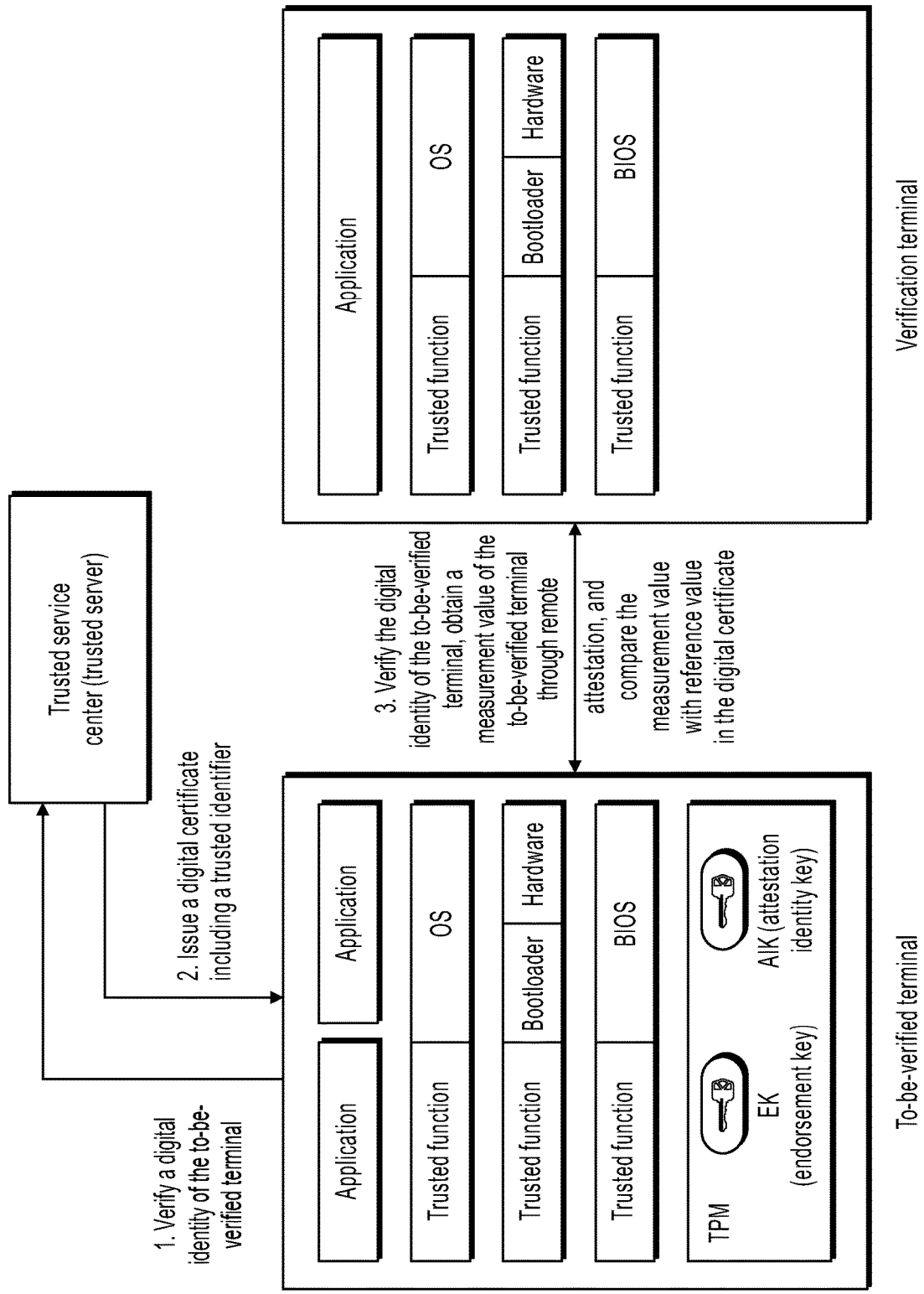
FIG. 6 is a block diagram illustrating a method for data processing in identity verification, according to another implementation of the present specification.

FIG. 6 is a block diagram illustrating a method for data processing in identity verification, according to another implementation of the present specification. As shown in FIG. 6, a system for data processing in identity verification in this implementation of the present specification can include a trusted service center (namely, a trusted server described in this implementation of the present specification), a to-be-verified terminal, and a verification terminal.

In a specific implementation process, before the verification terminal verifies an identity of the to-be-verified terminal, the trusted service center can first verify a digital identity and a trusted state of the to-be-verified terminal. For a method for performing identity verification on the to-be-verified terminal by the trusted service center, references can be made to the description in the previous implementations. For example, the trusted service center can verify the digital identity of the to-be-verified terminal by verifying a digital certificate obtained by the to-be-verified terminal by applying to a CA in advance. For a specific process of performing digital identity verification, references can be made to the description in the previous implementations. Details are omitted here for simplicity.

Step 504: Issue a digital certificate including a reference value of the to-be-verified terminal to the to-be-verified terminal if the verification on the digital identity of the to-be-verified terminal succeeds, so that the verification terminal performs identity verification on the to-be-verified terminal based on the digital certificate including the reference value of the to-be-verified terminal.

In a specific implementation process, the trusted service center verifies the digital certificate of the to-be-verified terminal. If the digital certificate of the to-be-verified terminal is issued by a CA and the to-be-verified terminal has a private key corresponding to the digital certificate, the trusted service center can consider that the verification on the digital identity of the to-be-verified terminal succeeds, and the trusted service center can issue the digital certificate including the reference value of the to-be-verified terminal to the to-be-verified terminal. Alternatively, the trusted service center includes a CA, and the trusted service center verifies the digital identity of the to-be-verified terminal by using a public-private key pair; and after the digital identity verification succeeds, the trusted service center can issue a digital certificate to the to-be-verified terminal by using the CA, where the digital certificate includes the reference value of the to-be-verified terminal. The reference value of the to-be-verified terminal can be obtained by the trusted service center from the to-be-verified terminal in advance. For a specific meaning and an acquisition method of the reference value, references can be to the description in the previous implementations. Details are omitted here for simplicity.

When the verification terminal needs to perform identity verification on the to-be-verified terminal, the verification terminal can obtain the digital certificate of the to-be-verified terminal, and first verify the digital identity of the to-be-verified terminal by using the digital certificate. After the digital identity verification succeeds, the verification terminal can obtain a measurement value of the to-be-verified terminal by using a remote attestation technology, and compare the measurement value with the reference value in the digital certificate to verify a trusted state of the to-be-verified terminal. The verification terminal can consider that the to-be-verified terminal is in a trusted state if the measurement value is the same as the reference value; otherwise, the verification terminal can consider that the to-be-verified terminal is not trusted. For a method for verifying the digital identity and the trusted state of the to-be-verified terminal, references can be made to the description in the previous implementations. Details are omitted here for simplicity.

According to the method for data processing in identity verification provided in this implementation of the present specification, after the digital identity verification on the to-be-verified terminal succeeds, the trusted service center adds the reference value of the to-be-verified terminal to the digital certificate of the to-be-verified terminal. Therefore, the verification terminal can perform identity verification and trusted state verification on the to-be-verified terminal based on the digital certificate and the reference value of the to-be-verified terminal. The verification terminal verifies the trusted state of the to-be-verified terminal in real time, thereby implementing real-time verification of the trusted state, and improving accuracy of a trusted verification result of the to-be-verified terminal. In addition, the verification terminal does not need to obtain the reference value of the to-be-verified terminal from another device, thereby improving identity verification efficiency and compatibility.

Figure 7:
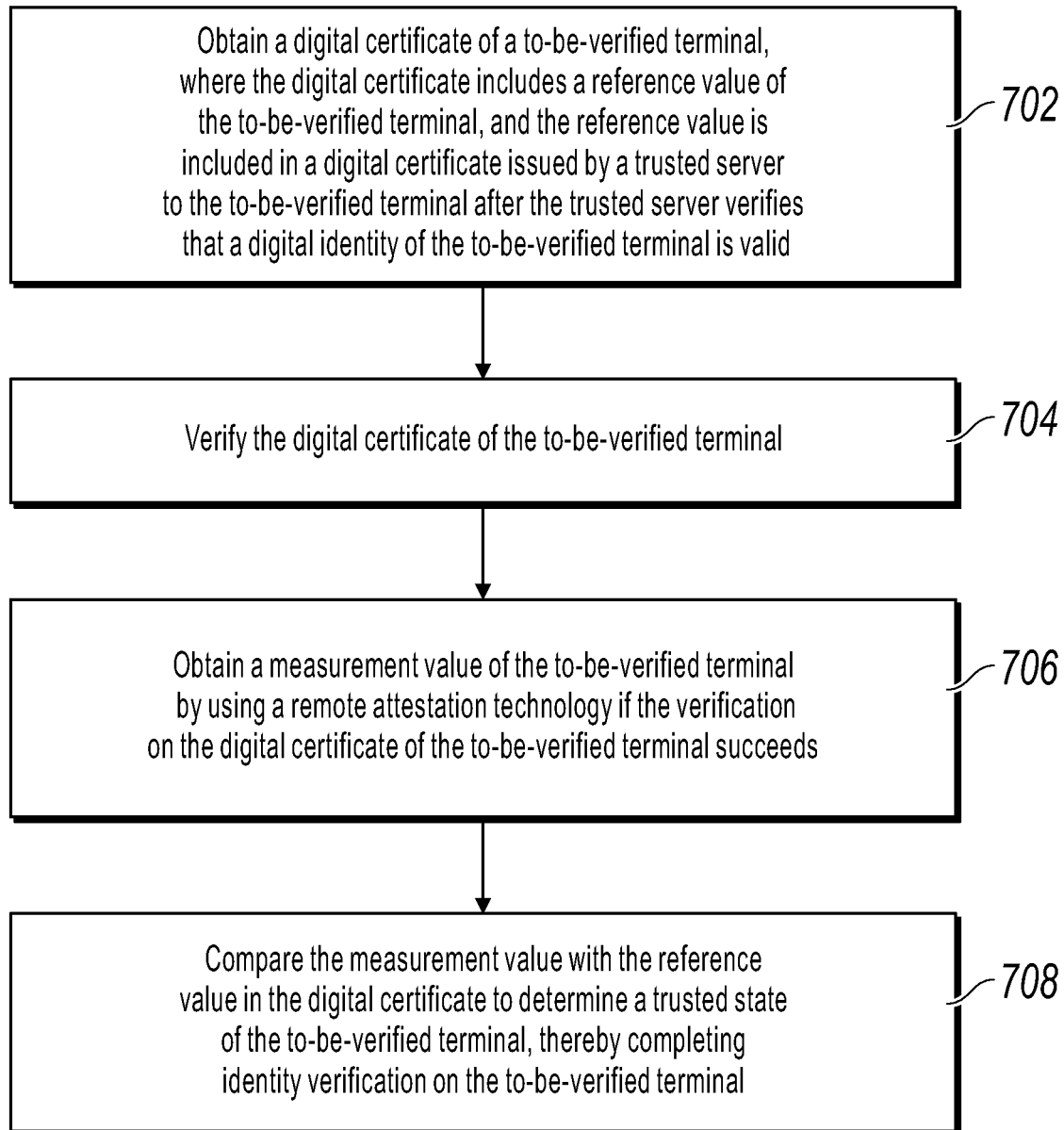
FIG. 7 is a schematic flowchart illustrating a method for data processing in identity verification performed by a verification terminal, according to another implementation of the present specification.

FIG. 7 is a schematic flowchart illustrating a method for data processing in identity verification performed by a verification terminal, according to another implementation of the present specification. As shown in FIG. 7, this implementation of the present specification further provides a method for data processing in identity verification, including the following steps.

Step 702: Obtain a digital certificate of a to-be-verified terminal, where the digital certificate includes a reference value of the to-be-verified terminal, and the reference value is included in a digital certificate issued by a trusted server to the to-be-verified terminal after the trusted server verifies that a digital identity of the to-be-verified terminal is valid.

In a specific implementation process, when the verification terminal needs to perform identity verification on the to-be-verified terminal before performing data communication with the to-be-verified terminal, the verification terminal can request to obtain the digital certificate of the to-be-verified terminal. The digital certificate of the to-be-verified terminal can be a digital certificate including the reference value of the to-be-verified terminal issued by a trusted service center after verification on the digital identity of the to-be-verified terminal succeeds.

Step 704: Verify the digital certificate of the to-be-verified terminal.

After obtaining the digital certificate of the to-be-verified terminal, the verification terminal can verify whether the digital certificate is valid, for example, verify whether the digital certificate is issued by a CA, and check a certificate validity period or a CA revocation list to check whether the certificate expires or is revoked. Then, the verification terminal can send a random number to the to-be-verified terminal, to request the to-be-verified terminal to sign the random number by using a private key of the to-be-verified terminal, and the verification terminal can verify the digital signature by using a public key in the digital certificate, to verify whether the to-be-verified terminal has a private key corresponding to the digital certificate, thereby verifying the digital identity of the to-be-verified terminal. Certainly, based on actual demands, the verification terminal can use other methods to verify the digital identity of the to-be-verified terminal by verifying the digital certificate of the to-be-verified terminal. Implementations are not specifically limited in this implementation of the present specification.

Step 706: Obtain a measurement value of the to-be-verified terminal by using a remote attestation technology if the verification on the digital certificate of the to-be-verified terminal succeeds.

In a specific implementation process, after verifying that the digital identity of the to-be-verified terminal is valid, the verification terminal can request to obtain the measurement value of the to-be-verified terminal by using the remote verification technology. The to-be-verified terminal can sign the measurement value of the to-be-verified terminal by using the digital certificate and a private key in a trusted computing chip, and then send the measurement value to the verification terminal. The verification terminal can verify the signed data, and trust the measurement value after verifying that both the certificate and the signature are valid. The verification terminal can perform subsequent trusted state verification by using the measurement value.

Step 708: Compare the measurement value with the reference value in the digital certificate to determine a trusted state of the to-be-verified terminal, thereby completing identity verification on the to-be-verified terminal.

In a specific implementation process, after obtaining the measurement value of the to-be-verified terminal, the verification terminal can compare the measurement value with the reference value in the digital certificate received by the verification terminal, and can consider that the to-be-verified terminal is in a trusted state if the measurement value is the same as the reference value. For meanings of the measurement value and the reference value, references can be made to the description in the previous implementation. Details are omitted here for simplicity.

According to the method for data processing in identity verification provided in this implementation of the present specification, after the digital identity verification on the to-be-verified terminal succeeds, the trusted service center adds the reference value of the to-be-verified terminal to the digital certificate of the to-be-verified terminal and issues the digital certificate to the to-be-verified terminal. Therefore, the verification terminal can perform identity verification and trusted state verification on the to-be-verified terminal based on the digital certificate and the reference value of the to-be-verified terminal. The verification terminal verifies the trusted state of the to-be-verified terminal in real time, thereby implementing real-time verification of the trusted state, and improving accuracy of a trusted verification result of the to-be-verified terminal. In addition, the verification terminal does not need to obtain the reference value of the to-be-verified terminal from another device, thereby improving identity verification efficiency and compatibility.

Figure 8:
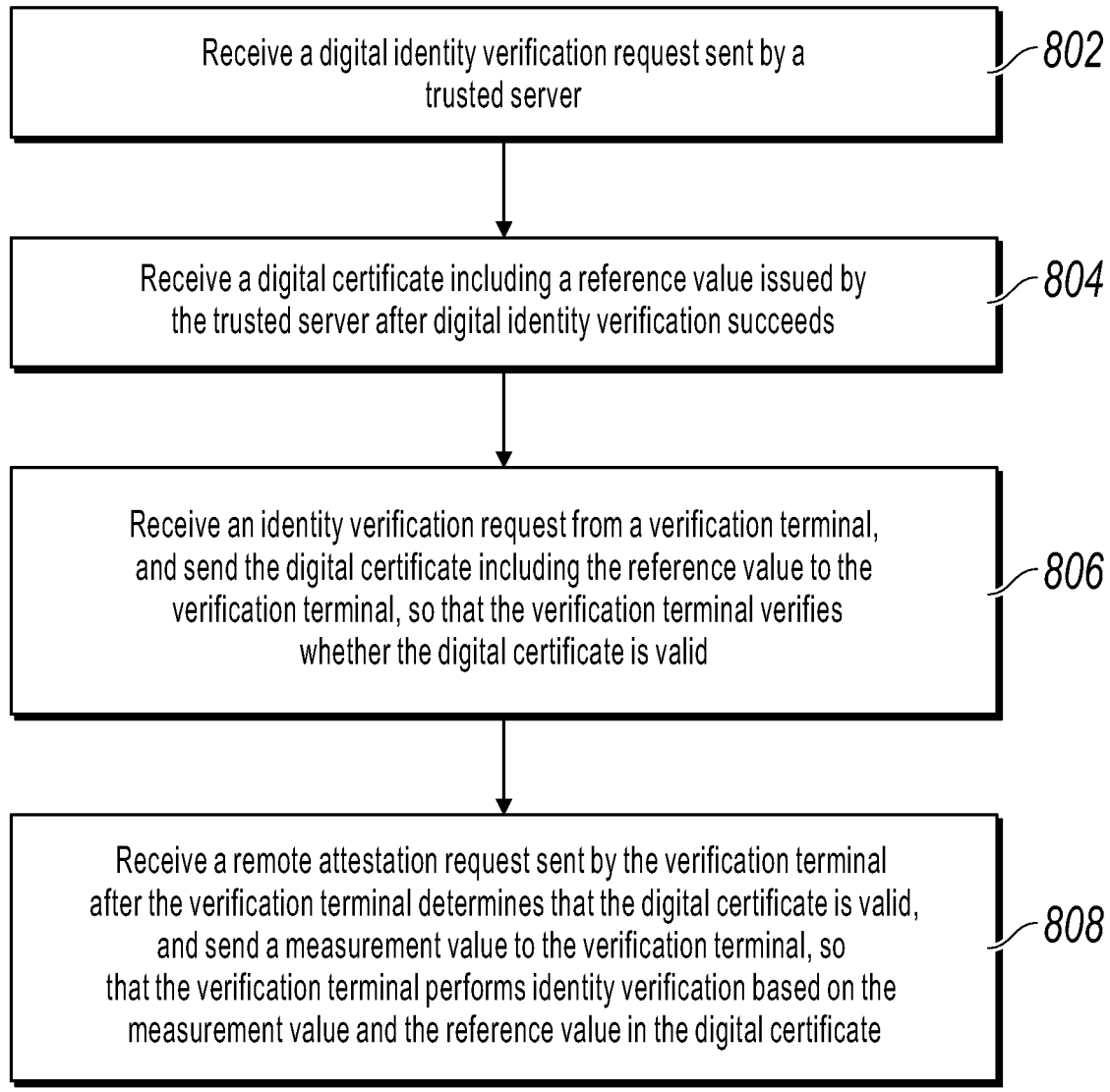
FIG. 8 is a schematic flowchart illustrating a method for data processing in identity verification performed by a to-be-verified terminal, according to another implementation of the present specification.

FIG. 8 is a schematic flowchart illustrating a method for data processing in identity verification performed by a to-be-verified terminal, according to another implementation of the present specification. As shown in FIG. 8, this implementation of the present specification further provides a method for data processing in identity verification, including the following steps.

Step 802: Receive a digital identity verification request sent by a trusted server.

In a specific implementation process, before a verification terminal verifies an identity of the to-be-verified terminal, a trusted service center, namely, the trusted server, can first verify a digital identity and a trusted state of the to-be-verified terminal. The trusted service center can send the digital identity verification request to the to-be-verified terminal, and verify the digital identity of the to-be-verified terminal by using a public-private key pair, a password, a digital certificate, etc. For example, the to-be-verified terminal can apply to a CA, namely, a certificate authority, for a digital certificate of the to-be-verified terminal in advance. Before the verification terminal verifies the identity of the to-be-verified terminal, the trusted service center, namely, the trusted server, can first verify the digital identity of the to-be-verified terminal. When the trusted service center needs to verify the digital identity of the to-be-verified terminal, the trusted service center can request the to-be-verified terminal to send the digital certificate to the trusted service center. The trusted service center can verify the digital identity of the to-be-verified terminal by verifying the digital certificate of the to-be-verified terminal. For a process in which the trusted service center verifies the digital identity of the to-be-verified terminal, references can be made to the description in the previous implementations. Details are omitted here for simplicity.

Step 804: Receive a digital certificate including a reference value issued by the trusted server after digital identity verification succeeds.

In a specific implementation process, after verifying that the digital identity of the to-be-verified terminal is valid, the trusted service center can issue the digital certificate including the reference value of the to-be-verified terminal to the to-be-verified terminal, and the to-be-verified terminal can receive the digital certificate including the reference value of the to-be-verified terminal sent by the trusted server. The trusted service center can add the reference value of the to-be-verified terminal to an extended field of the digital certificate that the to-be-verified terminal requests the CA to issue. The reference value of the to-be-verified terminal can be obtained by the trusted service center in advance, and a specific acquisition method is not specifically limited in this implementation of the present specification.

Step 806: Receive an identity verification request from the verification terminal, and send the digital certificate including the reference value to the verification terminal, so that the verification terminal verifies whether the digital certificate is valid.

In a specific implementation process, when the verification terminal needs to perform identity verification on the to-be-verified terminal before communicating with the to-be-verified terminal, the verification terminal can send the identity verification request to the to-be-verified terminal. After receiving the identity verification request, the to-be-verified terminal can send the digital certificate including the reference value to the verification terminal. The verification terminal can verify the digital identity of the to-be-verified terminal by verifying the received digital certificate. For a method for verifying the digital identity of the to-be-verified terminal by the verification terminal, references can be made to the description in the previous implementations. Details are omitted here for simplicity.

Step 808: Receive a remote attestation request sent by the verification terminal after the verification terminal determines that the digital certificate is valid, and send a measurement value to the verification terminal, so that the verification terminal performs identity verification based on the measurement value and the reference value in the digital certificate.

In a specific implementation process, after verifying that the digital identity of the to-be-verified terminal is valid, the verification terminal can further request to obtain the measurement value of the to-be-verified terminal by using a remote attestation technology, and compare the obtained measurement value with the reference value in the digital certificate to verify the trusted state of the to-be-verified terminal. For a method for verifying the trusted state of the to-be-verified terminal by the verification terminal by using the remote technology, references can be made to the description in the previous implementations. Details are omitted here for simplicity.

According to the method for data processing in identity verification provided in this implementation of the present specification, after the digital identity verification on the to-be-verified terminal succeeds, the trusted service center adds the reference value of the to-be-verified terminal to the digital certificate of the to-be-verified terminal and issues the digital certificate to the to-be-verified terminal. Therefore, the verification terminal can perform identity verification and trusted state verification on the to-be-verified terminal based on the digital certificate and the reference value of the to-be-verified terminal. The verification terminal verifies the trusted state of the to-be-verified terminal in real time, thereby implementing real-time verification of the trusted state, and improving accuracy of a trusted verification result of the to-be-verified terminal. In addition, the verification terminal does not need to obtain the reference value of the to-be-verified terminal from another device, thereby improving identity verification efficiency and compatibility.

With reference to FIG. 6, the following specifically describes a process of the method for data processing in identity verification in the implementations of the present specification. For specific meanings of OS, Bootloader, BIOS, EK, and AIK in a to-be-verified terminal and a verification terminal in FIG. 6, references can be made to the description in the previous implementations. Details are omitted here for simplicity.

In this implementation of the present specification, a trusted service center can be established in a network system, and the trusted service center verifies a digital identity of a network entity. After verifying a digital identity of the to-be-verified terminal, the trusted service center is not forced to verify a trusted state of the to-be-verified terminal. Instead, the trusted service center issues a digital certificate including a reference value of the to-be-verified terminal, where the reference value can be placed in an extended field of the digital certificate. After receiving the digital certificate of the to-be-verified terminal, the verification terminal can request the to-be-verified terminal to provide a measurement value through remote attestation. After comparing the measurement value of the to-be-verified terminal with the reference value in the certificate, the verification terminal can determine the trusted state of the to-be-verified terminal. The verification terminal verifies whether an instant state (when a request occurs) of the to-be-verified terminal is trusted, so that time validity is better, thereby improving trusted verification accuracy of the to-be-verified terminal.

The implementations of the method in the present specification are described in a progressive way. For same or similar parts of the implementations, mutual references can be made to the implementations. Each implementation focuses on a difference from other implementations. For related parts, references can be made to some descriptions in the method implementations.

Based on the previously described method for data processing in identity verification, one or more implementations of the present specification further provide a trusted server, a verification terminal, and a to-be-verified terminal for data processing in identity verification. The trusted server, the verification terminal, or the to-be-verified terminal can include an apparatus that uses a system (including a distributed system), software (an application), a module, a component, a server, a client, etc. of the method described in the implementations of the present specification and that includes necessary implementation hardware. Based on the same innovative concept, the trusted server, the verification terminal, and the to-be-verified terminal provided in the one or more implementations of the present specification are described in the following implementations. Because problem-resolving implementation solutions of the trusted server, the verification terminal, and the to-be-verified terminal are similar to problem resolving solutions of the method, for specific implementation of the trusted server, the verification terminal, and the to-be-verified terminal in the implementations of the present specification, references can be made to implementation of the previous method. No repeated descriptions are provided. The term "unit" or "module" used in the following can implement a combination of software and/or hardware with a predetermined function. Although the trusted server, the verification terminal, and the to-be-verified terminal described in the following implementations are preferably implemented by software, implementation of hardware or a combination of software and hardware is possible to conceive.

Figure 9:
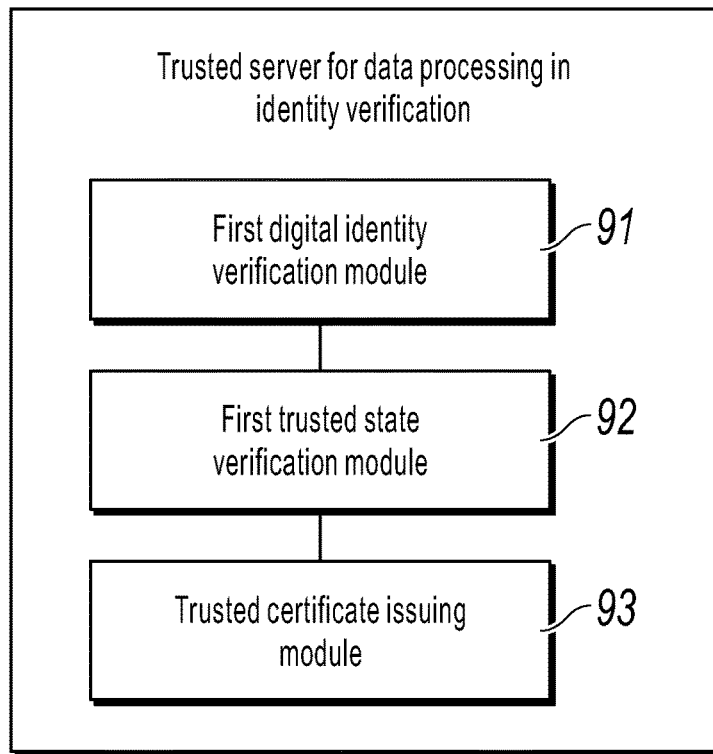
FIG. 9 is a schematic structural diagram of modules of an implementation of a trusted server for data processing in identity verification, according to the present specification.

Specifically, FIG. 9 is a schematic structural diagram of modules of an implementation of a trusted server for data processing in identity verification, according to the present specification. As shown in FIG. 9, the trusted server for data processing in identity verification provided in the present specification can include first digital identity verification module 91, first trusted state verification module 92, and trusted certificate issuing module 93.

First digital identity verification module 91 can be configured to verify a digital identity of a to-be-verified terminal.

First trusted state verification module 92 can be configured to: if the verification on the digital identity of the to-be-verified terminal succeeds, verify whether the to-be-verified terminal is in a trusted state by using a remote attestation technology.

Trusted certificate issuing module 93 can be configured to: if it is verified that the to-be-verified terminal is in the trusted state, issue a digital certificate including a trusted identifier to the to-be-verified terminal, so that a verification terminal performs identity verification on the to-be-verified terminal based on the digital certificate including the trusted identifier.

According to the trusted server for data processing in identity verification provided in this implementation of the present specification, digital identity verification is used in combination with a trusted computing technology to perform identity verification, and a trusted service center is configured to perform pre-verification on the to-be-verified terminal. After verification on both the digital identity and a trusted state of the to-be-verified terminal succeeds, the trusted identifier is added to the digital certificate of the to-be-verified terminal, so that the verification terminal can directly verify both the digital identity of the to-be-verified terminal and the trusted state of the device based on the digital certificate including the trusted identifier. In addition, the verification terminal does not need to be capable of parsing a trusted protocol, and only needs to verify the trusted identifier in the digital certificate. Compared with a solution in which a digital certificate and a trusted computing technology are separately used, in the method provided in this implementation of the present specification, only the digital certificate needs to be parsed without obtaining a reference value or parsing a remote attestation protocol, so that engineering implementation is easier, thereby reducing workload and identity verification difficulty of the verification terminal, and improving identity verification efficiency.

Based on the previous implementation, in some implementations of the present specification, the trusted certificate issuing module is specifically configured to: set a validity period of the digital certificate including the trusted identifier when issuing the digital certificate including the trusted identifier to the to-be-verified terminal.

In this implementation of the present specification, the validity period of the digital certificate including the trusted identifier is set, so that trustiness of the trusted state of the to-be-verified terminal can be improved, thereby improving identity verification accuracy and further improving system security.

Based on the previous implementation, in some implementations of the present specification, the first digital identity verification module is specifically configured to: verify the digital identity of the to-be-verified terminal by verifying a digital certificate of the to-be-verified terminal, where the digital certificate is obtained by the to-be-verified terminal by applying to a certificate authority; and correspondingly, the trusted certificate issuing module is specifically configured to: add the trusted identifier to the digital certificate obtained by the to-be-verified terminal by applying to the certificate authority, and issue, to the to-be-verified terminal, the digital certificate that the trusted identifier is added to.

In this implementation of the present specification, the digital identity of the to-be-verified terminal is verified by using the digital certificate, and after verification on the digital identity and the trusted state succeeds, the trusted identifier is directly added to the digital certificate of the to-be-verified terminal. The digital certificate is used in combination with the trusted computing technology to perform identity verification on the terminal device. Only the digital certificate needs to be parsed without obtaining a reference value or parsing a remote attestation protocol, so that engineering implementation is easier, thereby reducing workload and identity verification difficulty of the verification terminal, and improving identity verification efficiency.

Based on the previous implementation, in some implementations of the present specification, the trusted certificate issuing module is specifically configured to: set the trusted identifier in an extended field of the digital certificate.

In this implementation of the present specification, the trusted identifier is predetermined in the extended field of the digital certificate, to label the trusted state of the to-be-verified terminal without damaging the original digital certificate.

Figure 10:
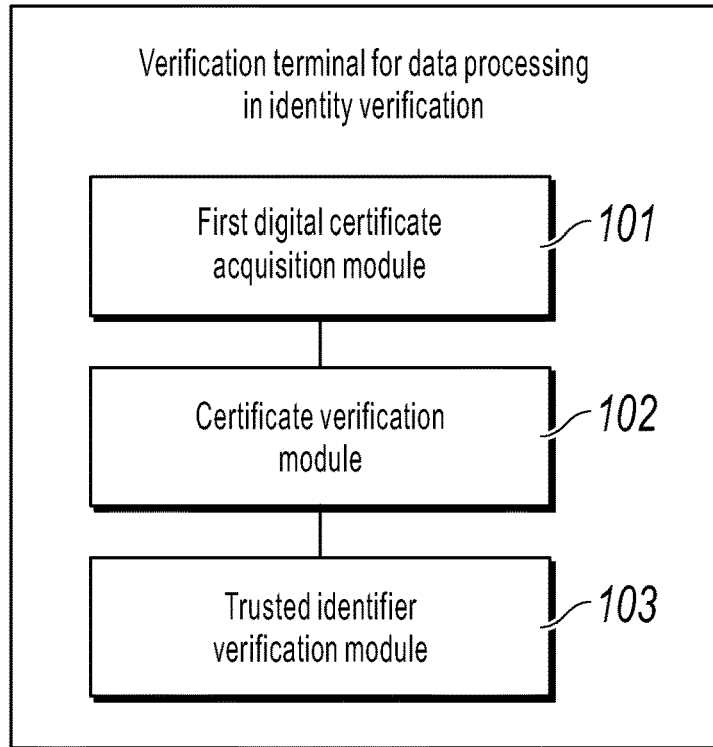
FIG. 10 is a schematic structural diagram of modules of an implementation of a verification terminal for data processing in identity verification, according to the present specification.

FIG. 10 is a schematic structural diagram of modules of an implementation of a verification terminal for data processing in identity verification, according to the present specification. As shown in FIG. 10, the verification terminal for data processing in identity verification provided in the present specification can include first digital certificate acquisition module 101, certificate verification module 102, and trusted identifier verification module 103.

First digital certificate acquisition module 101 can be configured to obtain a digital certificate of a to-be-verified terminal.

The certificate verification module 102 can be configured to verify the digital certificate of the to-be-verified terminal.

Trusted identifier verification module 103 can be configured to verify whether the digital certificate includes a trusted identifier when the verification on the digital certificate of the to-be-verified terminal succeeds, and determine that an identity of the to-be-verified terminal is valid if the digital certificate includes the trusted identifier.

The trusted identifier is in a digital certificate issued by a trusted server to the to-be-verified terminal after verification on both a digital identity and a trusted state of the to-be-verified terminal succeeds.

In this implementation of the present specification, a trusted service center is configured to perform pre-verification on the to-be-verified terminal. After verification on both the digital identity and the trusted state of the to-be-verified terminal succeeds, the trusted identifier is added to the digital certificate of the to-be-verified terminal, so that the verification terminal can directly verify both the digital identity of the to-be-verified terminal and the trusted state of the device based on the digital certificate including the trusted identifier. In addition, the verification terminal does not need to be capable of parsing a trusted protocol, and only needs to verify the trusted identifier in the digital certificate. Compared with a solution in which a digital certificate and a trusted computing technology are separately used, in the method provided in this implementation of the present specification, only the digital certificate needs to be parsed without obtaining a reference value or parsing a remote attestation protocol, so that engineering implementation is easier, thereby reducing workload and identity verification difficulty of the verification terminal, and improving identity verification efficiency.

Figure 11:
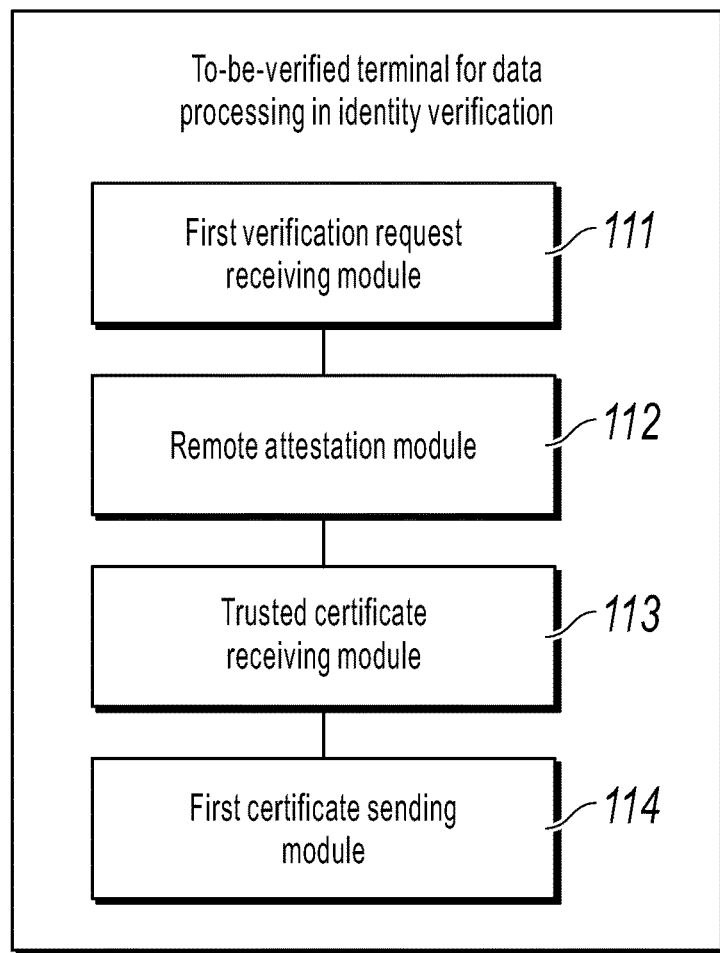
FIG. 11 is a schematic structural diagram of modules of an implementation of a to-be-verified terminal for data processing in identity verification, according to the present specification.

FIG. 11 is a schematic structural diagram of modules of an implementation of a to-be-verified terminal for data processing in identity verification, according to the present specification. As shown in FIG. 11, the to-be-verified terminal for data processing in identity verification provided in the present specification can include first verification request receiving module 111, remote attestation module 112, trusted certificate receiving module 113, and first certificate sending module 114.

First verification request receiving module 111 can be configured to receive a digital identity verification request sent by a trusted server.

Remote attestation module 112 can be configured to receive a remote attestation request sent by the trusted server after digital identity verification succeeds, and send a measurement value to the trusted server, so that the trusted server compares the measurement value with a corresponding reference value stored in the trusted server.

Trusted certificate receiving module 113 can be configured to receive a digital certificate including a trusted identifier issued by the trusted server, where the digital certificate including the trusted identifier is issued by the trusted server after the trusted server determines that the measurement value is the same as the reference value.

First certificate sending module 114 can be configured to receive an identity verification request from a verification terminal, and send the digital certificate including the trusted identifier to the verification terminal, so that the verification terminal performs identity verification based on the digital certificate including the trusted identifier.

In this implementation of the present specification, a trusted service center is configured to perform pre-verification on the to-be-verified terminal. After verification on both a digital identity and a trusted state of the to-be-verified terminal succeeds, the trusted identifier is added to the digital certificate of the to-be-verified terminal, so that the verification terminal can directly verify both the digital identity of the to-be-verified terminal and the trusted state of the device based on the digital certificate including the trusted identifier. In addition, the verification terminal does not need to be capable of parsing a trusted protocol, and only needs to verify the trusted identifier in the digital certificate. Compared with a solution in which a digital certificate and a trusted computing technology are separately used, in the method provided in this implementation of the present specification, only the digital certificate needs to be parsed without obtaining a reference value or parsing a remote attestation protocol, so that engineering implementation is easier, thereby reducing workload and identity verification difficulty of the verification terminal, and improving identity verification efficiency.

Based on the previous implementation, in some implementations of the present specification, the to-be-verified terminal further includes a dynamic memory and/or a trusted computing chip; a private key corresponding to the digital certificate including the trusted identifier is stored in the dynamic memory or the trusted computing chip; and access permission of the digital certificate including the trusted identifier is set when the private key is stored in the trusted computing chip, where the access permission indicates that the digital certificate including the trusted identifier is allowed to be accessed only by a terminal in a trusted state.

In this implementation of the present specification, a method for storing the private key of the to-be-verified terminal is set to store the private key in the dynamic memory or the trusted computing chip, and access permission of the private key is set to improve security of the private key, thereby further improving system security.

Figure 12:
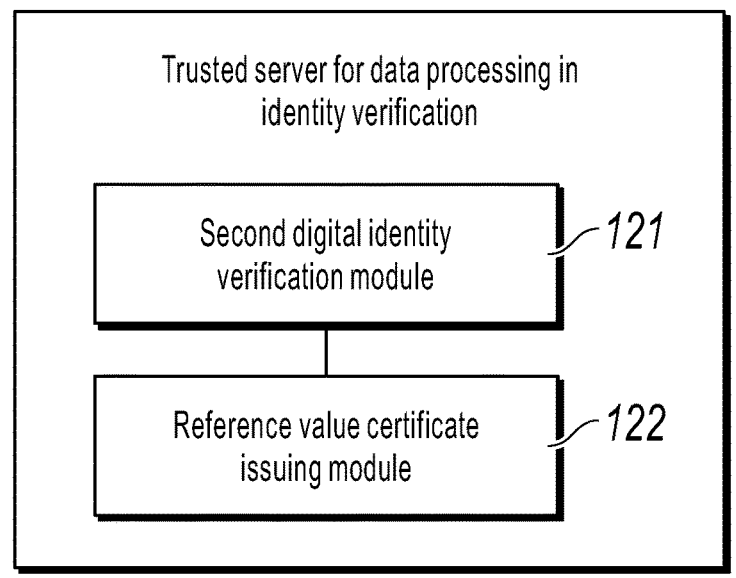
FIG. 12 is a schematic structural diagram of modules of an implementation of a trusted server for data processing in identity verification, according to the present specification.

FIG. 12 is a schematic structural diagram of modules of an implementation of a trusted server for data processing in identity verification, according to the present specification. As shown in FIG. 12, the trusted server for data processing in identity verification provided in the present specification can include second digital identity verification module 121 and reference value certificate issuing module 122.

Second digital identity verification module 121 can be configured to verify a digital identity of a to-be-verified terminal by verifying a digital certificate of the to-be-verified terminal, where the digital certificate is obtained by the to-be-verified terminal by applying to a certificate authority.

Reference value certificate issuing module 122 can be configured to issue a digital certificate including a reference value of the to-be-verified terminal to the to-be-verified terminal if the verification on the digital identity of the to-be-verified terminal succeeds, so that a verification terminal performs identity verification on the to-be-verified terminal based on the digital certificate including the reference value.

In this implementation of the present specification, after the digital identity verification on the to-be-verified terminal succeeds, a trusted service center adds the reference value of the to-be-verified terminal to the digital certificate of the to-be-verified terminal. Therefore, the verification terminal can perform identity verification and trusted state verification on the to-be-verified terminal based on the digital certificate and the reference value of the to-be-verified terminal. The verification terminal verifies a trusted state of the to-be-verified terminal in real time, thereby implementing real-time verification of the trusted state, and improving accuracy of a trusted verification result of the to-be-verified terminal. In addition, the verification terminal does not need to obtain the reference value of the to-be-verified terminal from another device, thereby improving identity verification efficiency and compatibility.

Figure 13:
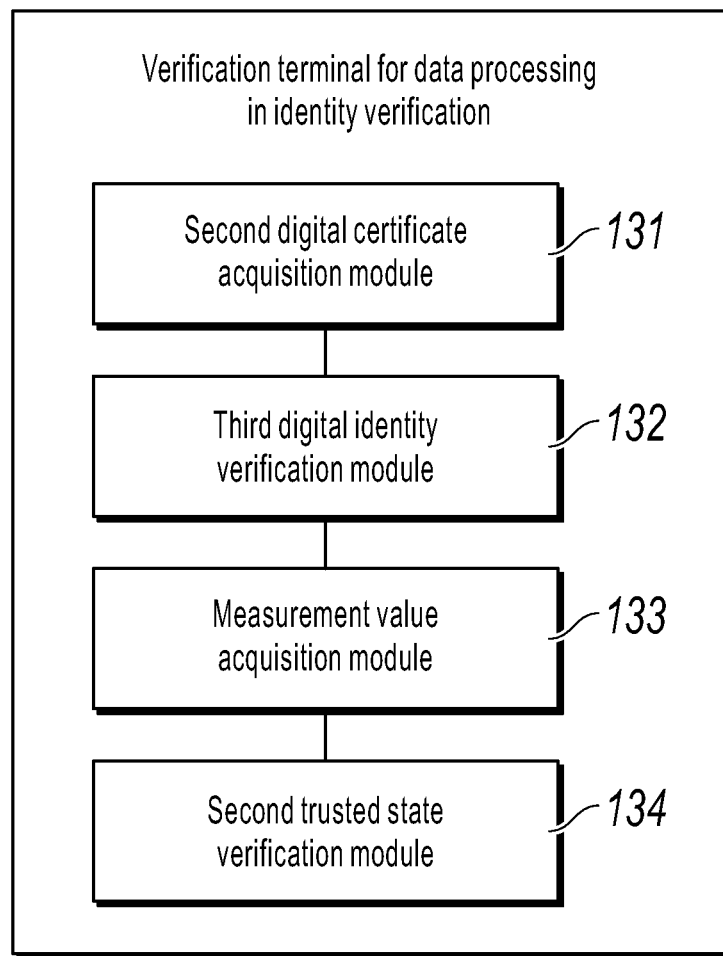
FIG. 13 is a schematic structural diagram of modules of an implementation of a verification terminal for data processing in identity verification, according to the present specification.

FIG. 13 is a schematic structural diagram of modules of an implementation of a verification terminal for data processing in identity verification, according to the present specification. As shown in FIG. 13, the verification terminal for data processing in identity verification provided in the present specification can include second digital certificate acquisition module 131, third digital identity verification module 132, measurement value acquisition module 133, and second trusted state verification module 134.

Second digital certificate acquisition module 131 can be configured to obtain a digital certificate of a to-be-verified terminal, where the digital certificate includes a reference value of the to-be-verified terminal, and the reference value is included in a digital certificate issued by a trusted server to the to-be-verified terminal after the trusted server verifies that a digital identity of the to-be-verified terminal is valid.

Third digital identity verification module 132 can be configured to verify the digital certificate of the to-be-verified terminal.

Measurement value acquisition module 133 can be configured to obtain a measurement value of the to-be-verified terminal by using a remote attestation technology if the verification on the digital certificate of the to-be-verified terminal succeeds.

Second trusted state verification module 134 can be configured to compare the measurement value with the reference value in the digital certificate to determine a trusted state of the to-be-verified terminal, thereby completing identity verification on the to-be-verified terminal.

In this implementation of the present specification, after digital identity verification on the to-be-verified terminal succeeds, the trusted service center adds the reference value of the to-be-verified terminal to the digital certificate of the to-be-verified terminal. Therefore, the verification terminal can perform identity verification and trusted state verification on the to-be-verified terminal based on the digital certificate and the reference value of the to-be-verified terminal. The verification terminal verifies the trusted state of the to-be-verified terminal in real time, thereby implementing real-time verification of the trusted state, and improving accuracy of a trusted verification result of the to-be-verified terminal. In addition, the verification terminal does not need to obtain the reference value of the to-be-verified terminal from another device, thereby improving identity verification efficiency and compatibility.

Figure 14:
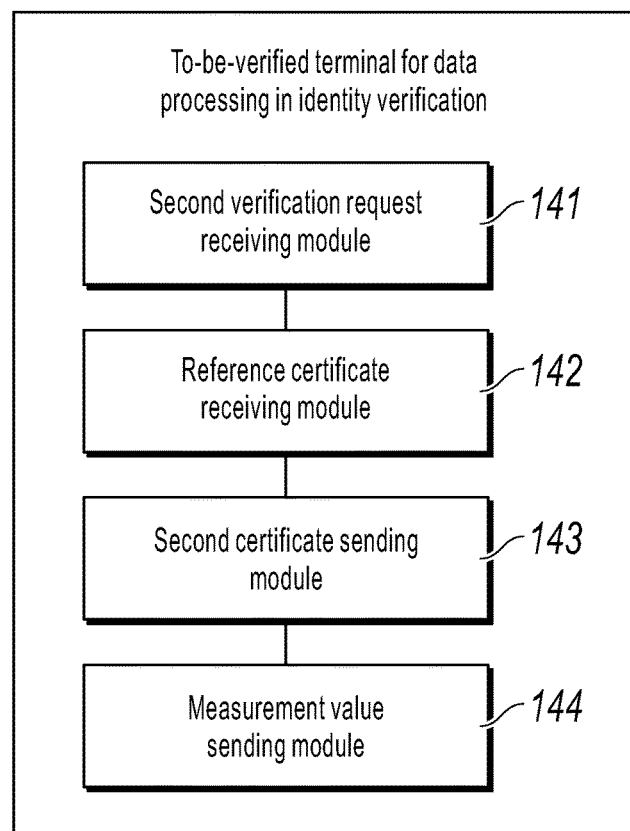
FIG. 14 is a schematic structural diagram of modules of an implementation of a to-be-verified terminal for data processing in identity verification, according to the present specification.

FIG. 14 is a schematic structural diagram of modules of an implementation of a to-be-verified terminal for data processing in identity verification, according to the present specification. As shown in FIG. 14, the to-be-verified terminal for data processing in identity verification provided in the present specification can include second verification request receiving module 141, reference certificate receiving module 142, second certificate sending module 143, and measurement value sending module 144.

Second verification request receiving module 141 can be configured to receive a digital identity verification request sent by a trusted server.

Reference certificate receiving module 142 can be configured to receive a digital certificate including a reference value issued by the trusted server after digital identity verification succeeds.

Second certificate sending module 143 can be configured to receive an identity verification request from a verification terminal, and send the digital certificate including the reference value to the verification terminal, so that the verification terminal verifies whether the digital certificate is valid.

Measurement value sending module 144 can be configured to receive a remote attestation request sent by the verification terminal after the verification terminal determines that the digital certificate is valid, and send a measurement value to the verification terminal, so that the verification terminal performs identity verification based on the measurement value and the reference value in the digital certificate.

In this implementation of the present specification, after the digital identity verification on the to-be-verified terminal succeeds, a trusted service center adds the reference value of the to-be-verified terminal to the digital certificate of the to-be-verified terminal. Therefore, the verification terminal can perform identity verification and trusted state verification on the to-be-verified terminal based on the digital certificate and the reference value of the to-be-verified terminal. The verification terminal verifies a trusted state of the to-be-verified terminal in real time, thereby implementing real-time verification of the trusted state, and improving accuracy of a trusted verification result of the to-be-verified terminal. In addition, the verification terminal does not need to obtain the reference value of the to-be-verified terminal from another device, thereby improving identity verification efficiency and compatibility.

It is worthwhile to note that the previously described server and terminal can further include other implementations based on the description in the method implementations. For specific implementations, references can be made to the description in the previous corresponding method implementations. The specific implementations are not described one by one here.

An implementation of the present specification further provides a device for data processing in identity verification, including: at least one processor and a memory configured to store a processor-executable instruction, where the processor implements the method for data processing in identity verification in the previous implementations when executing the instruction. For example, the processor verifies a digital identity of a to-be-verified terminal; if the verification on the digital identity of the to-be-verified terminal succeeds, verifies whether the to-be-verified terminal is in a trusted state by using a remote attestation technology; and if it is verified that the to-be-verified terminal is in the trusted state, issues a digital certificate including a trusted identifier to the to-be-verified terminal, so that a verification terminal performs identity verification on the to-be-verified terminal based on the digital certificate including the trusted identifier.

Alternatively, the processor obtains a digital certificate of a to-be-verified terminal; verifies the digital certificate of the to-be-verified terminal; and verifies whether the digital certificate includes a trusted identifier if the verification on the digital certificate of the to-be-verified terminal succeeds, and determines that an identity of the to-be-verified terminal is valid if the digital certificate includes the trusted identifier, where the trusted identifier is in a digital certificate issued by a trusted server to the to-be-verified terminal after verification on both the digital identity and the trusted state of the to-be-verified terminal succeeds.

Alternatively, the processor receives a digital identity verification request sent by a trusted server; receives a remote attestation request sent by the trusted server after digital identity verification succeeds, and sends a measurement value to the trusted server, so that the trusted server compares the measurement value with a corresponding reference value stored in the trusted server; receives a digital certificate including a trusted identifier issued by the trusted server, where the digital certificate including the trusted identifier is issued by the trusted server after the trusted server determines that the measurement value is the same as the reference value; and receives an identity verification request from a verification terminal, and sends the digital certificate including the trusted identifier to the verification terminal, so that the verification terminal performs identity verification based on the digital certificate including the trusted identifier.

Alternatively, the processor verifies a digital identity of a to-be-verified terminal; and issues a digital certificate including a reference value of the to-be-verified terminal to the to-be-verified terminal if the verification on the digital identity of the to-be-verified terminal succeeds, so that a verification terminal performs identity verification on the to-be-verified terminal based on the digital certificate including the reference value.

Alternatively, the processor obtains a digital certificate of a to-be-verified terminal, where the digital certificate includes a reference value of the to-be-verified terminal, and the reference value is included in a digital certificate issued by a trusted server to the to-be-verified terminal after the trusted server verifies that a digital identity of the to-be-verified terminal is valid; verifies the digital certificate of the to-be-verified terminal; obtains a measurement value of the to-be-verified terminal by using a remote attestation technology if the verification on the digital certificate of the to-be-verified terminal succeeds; and compares the measurement value with the reference value in the digital certificate to determine a trusted state of the to-be-verified terminal, thereby completing identity verification on the to-be-verified terminal.

Alternatively, the processor receives a digital identity verification request sent by a trusted server; receives a digital certificate including a reference value issued by the trusted server after digital identity verification succeeds; receives an identity verification request from a verification terminal, and sends the digital certificate including the reference value to the verification terminal, so that the verification terminal verifies whether the digital certificate is valid; and receives a remote attestation request sent by the verification terminal after the verification terminal determines that the digital certificate is valid, and sends a measurement value to the verification terminal, so that the verification terminal performs identity verification based on the measurement value and the reference value in the digital certificate.

As shown in FIG. 2 or FIG. 6, an implementation of the present specification provides a system for data processing in identity verification, including: a trusted service center, at least one verified terminal, and at least one verification terminal. The trusted service center stores reference values of different terminals, a trusted computing chip is configured in the to-be-verified terminal, and the to-be-verified terminal has applied for a digital certificate.

The trusted service center includes at least one processor and a memory configured to store a processor-executable instruction, where the processor implements the method performed by the trusted service center in the previous implementations when executing the instruction.

The to-be-verified terminal includes at least one processor and a memory configured to store a processor-executable instruction, where the processor implements the method performed by the to-be-verified terminal in the previous implementations when executing the instruction.

The verification terminal includes at least one processor and a memory configured to store a processor-executable instruction, where the processor implements the method performed by the verification terminal in the previous implementations when executing the instruction.

It is worthwhile to note that the previously described processing device and system can further include other implementations based on the description in the method implementations. For specific implementations, references can be made to the description in the previous corresponding method implementations. The specific implementations are not described one by one here.

The server, the terminal, the device, or the system for data processing in identity verification provided in the present specification can also be applied to multiple types of data analysis and processing systems. The system, the server, the terminal, or the processing device can be an independent server, or can include a terminal apparatus that uses a server cluster, a system (including a distributed system), software (an application), an actual operation apparatus, a logic gate circuit apparatus, a quantum computer, etc. of one or more methods of the present specification or the system, the server, the terminal, or the processing device of one or more implementations and that includes necessary implementation hardware. The system, the server, the terminal, or the processing device can include at least one processor and a memory storing a computer-executable instruction. When executing the instruction, the processor implements the steps of the method in any one or more of the previous implementations.

Figure 15:
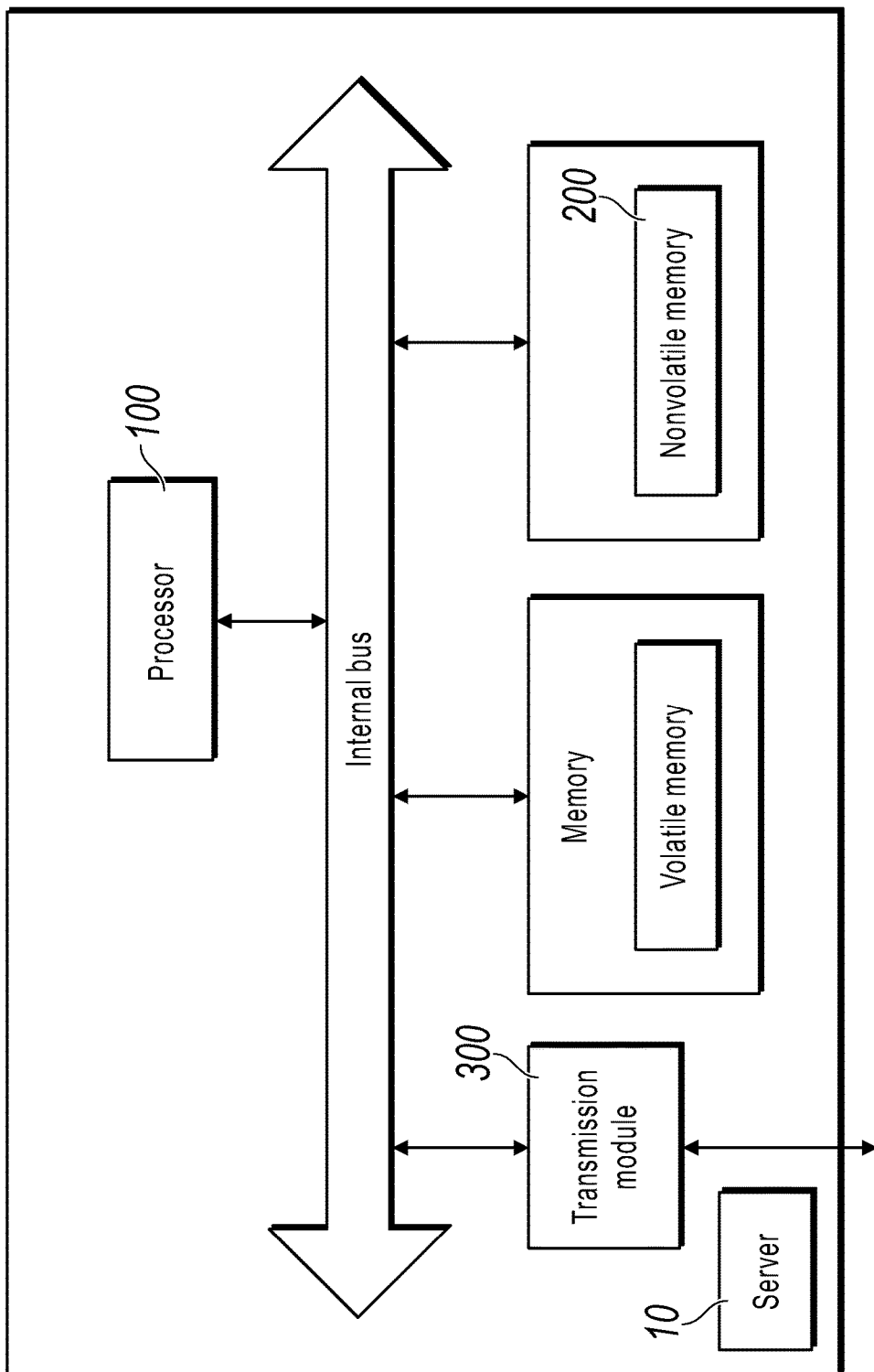
FIG. 15 is a block diagram illustrating a hardware structure of a server for data processing in identity verification, according to an implementation of the present specification.

The method implementations provided in the implementations of the present specification can be executed by a mobile terminal, a computer terminal, a server, or a similar operation apparatus. For example, the method implementations run on a server. FIG. 15 is a block diagram illustrating a hardware structure of a server for data processing in identity verification, according to an implementation of the present specification. The server can be the apparatus, the device, or the system for data processing in identity verification in the previous implementations. As shown in FIG. 15, server 10 can include one or more processors 100 (only one processor is shown in the figure) (the processor 100 can include but is not limited to a processing apparatus such as a microprocessor (MCU) or a programmable logic device (FPGA)), a memory 200 for storing data, and a transmission module 300 for a communications function. A person of ordinary skill in the art can understand that the structure shown in FIG. 15 is merely an example, and does not impose a limitation on the structure of the previous electronic apparatus. For example, server 10 can include more or fewer components than those components shown in FIG. 15, for example, can further include other processing hardware, such as a database, a multi-level cache, or a GPU; or can have a configuration different from the configuration shown in FIG. 15.

Memory 200 can be configured to store a software program and a module of application software, for example, a program instruction/module corresponding to the method for data processing in identity verification in the implementations of the present specification. Processor 100 executes various functional applications and resource data updating by running the software program and the module that are stored in memory 200. Memory 200 can include a high-speed random access memory, and can further include a nonvolatile memory, such as one or more magnetic storage apparatuses, flash memories, or other nonvolatile solid-state memories. In some examples, memory 200 can further include memories remotely configured relative to processor 100, and these remote memories can be connected to a computer terminal via a network. Examples of the network include but are not limited to the Internet, an intranet, a local area network, a mobile communications network, and a combination thereof.

Transmission module 300 is configured to receive or send data via a network. A specific example of the network can include a wireless network provided by a communications provider of a computer terminal. In an example, transmission module 300 includes a network interface controller (NIC), and the NIC can be connected to another network device by using a base station, to communicate with the Internet. In an example, transmission module 300 can be a radio frequency (RF) module, and the RF module is configured to communicate with the Internet in a wireless way.

Specific implementations of the present specification are described above. Other implementations fall within the scope of the appended claims. In some cases, the actions or steps described in the claims can be performed in an order different from the order in the implementations and the desired results can still be achieved. In addition, the process depicted in the accompanying drawings does not necessarily require a shown particular order to achieve the desired results. In some implementations, multi-tasking and parallel processing can be or may be advantageous.

The method or apparatus in the previous implementations provided in the present specification can implement service logic and record the service logic in a storage medium by using a computer program, and the storage medium can be read and executed by a computer, to implement the effects of the solutions described in the implementations of the present specification.

The storage medium can include a physical apparatus for storing information, and the information is usually digitized and then stored by using an electric medium, a magnetic medium, an optical medium, etc. The storage medium can include an apparatus for storing information in an electric energy way, for example, various memories such as a RAM or a ROM; an apparatus for storing information in a magnetic energy way, such as a hard disk, a floppy disk, a magnetic tape, a magnetic core memory, a magnetic bubble memory, or a USB flash drive; and an apparatus for storing information in an optical way, such as a CD or a DVD. Certainly, there are still readable storage media of other forms, such as a quantum memory and a graphene memory.

The method or apparatus for data processing in identity verification provided in the implementations of the present specification can be implemented by a processor by executing a corresponding program instruction in a computer, for example, can be implemented at a PC end by using C++ language in a Windows operating system, can be implemented by using a Linux system, can be implemented by an intelligent terminal by using an Android or iOS system program design language, or can be implemented based on processing logic of a quantum computer.

It is worthwhile to note that the apparatus, the computer storage medium, or the system previously described in the present specification can further include other implementations based on the description in the related method implementations. For specific implementations, references can be made to the description in the corresponding method implementations. The specific implementations are not described one by one here.

The implementations of the present specification are described in a progressive way. For same or similar parts of the implementations, mutual references can be made to the implementations. Each implementation focuses on a difference from other implementations. Especially, a hardware and program implementation is basically similar to a method implementation, and therefore is described briefly. For related parts, references can be made to some descriptions in the method implementations.

The implementations of the present specification are not limited to necessarily satisfying industry communications standards, standard computer resource data updating and data storage rules, or the cases described in one or more implementations of the present specification. A slightly modified implementation solution obtained based on some industry standards, or in a self-defined way, or based on the described implementations can also implement an implementation effect that is the same as, equivalent to, or similar to the previous implementations, or implement an expected implementation effect obtained after transformation. Implementations obtained by applying these modified or transformed data acquisition, storage, determining, and processing methods can still fall within the scope of optional implementation solutions of the implementations of the present specification.

In the 1990s, whether a technical improvement is a hardware improvement (for example, an improvement to circuit structures, such as a diode, a transistor, or a switch) or a software improvement (an improvement to a method process) can be clearly distinguished. However, as technologies develop, current improvements to many method processes can be considered as direct improvements to hardware circuit structures. Almost all designers program an improved method process into a hardware circuit, to obtain a corresponding hardware circuit structure. Therefore, a method process can be improved by using a hardware entity module. For example, a programmable logic device (PLD) (for example, a field programmable gate array (FPGA)) is such an integrated circuit, and a logical function of the PLD is determined by a user through device programming. A designer performs programming to "integrate" a digital system to a single PLD, without requiring a chip manufacturer to design and manufacture a dedicated integrated circuit chip. In addition, at present, instead of manually manufacturing an integrated circuit chip, this type of programming is mostly implemented by using "logic compiler" software. The "logic compiler" software is similar to a software compiler used to develop and write a program. Original code needs to be written in a particular programming language before compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The Very-High-Speed Integrated Circuit Hardware Description Language (VHDL) and Verilog are most commonly used at present. A person skilled in the art should also understand that a hardware circuit that implements a logical method process can be readily obtained provided that the method process is logically programmed by using several of the previous hardware description languages and is programmed into an integrated circuit.

A controller can be implemented by using any appropriate method. For example, the controller can be in a form of a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can be alternatively implemented as a part of control logic of the memory. A person skilled in the art also knows that, in addition to implementing the controller by using only the computer-readable program code, method steps can be logically programmed to allow the controller to implement the same function in a form of a logic gate, a switch, an ASIC, a programmable logic controller, or a built-in microcontroller. Therefore, the controller can be considered as a hardware component, and an apparatus that is included in the controller and configured to implement various functions can also be considered as a structure in the hardware component. Alternatively, the apparatus configured to implement various functions can even be considered as both a software module implementing the method and a structure in the hardware component.

The system, apparatus, module, or unit illustrated in the previous implementations can be specifically implemented by using a computer chip or an entity, or can be implemented by using a product having a certain function. A typical implementation device is a computer. Specifically, the computer can be, for example, a personal computer, a laptop computer, a vehicle-mounted human-machine interaction device, a cellular phone, a camera phone, a smartphone, a personal digital assistant, a media player, a navigation device, an email device, a game console, a tablet computer, a wearable device, or a combination of any of these devices.

Although the one or more implementations of the present specification provide the operation steps of the method according to the implementations or the flowcharts, conventional or non-creative means can include more or fewer operation steps. The sequence of the steps listed in the implementations is merely one of numerous step execution sequences, and does not represent the unique execution sequence. During actual execution of an apparatus or a terminal product, the steps listed in the implementations can be performed in the method sequence shown in the implementations or the accompanying drawings, or performed in parallel (for example, in a parallel processing or multi-thread processing environment, or even in a distributed resource data updating environment). The term "include", "comprise", or their any other variant is intended to cover non-exclusive inclusion, so that a process, a method, a product, or a device that includes a series of elements not only includes these elements, but also includes other elements that are not expressly listed, or further includes elements inherent to such process, method, product, or device. Without more constraints, an element preceded by "includes a . . . " does not preclude the existence of additional identical elements in the process, method, product, or device that includes the element. The words such as "first" and "second" are used to indicate names instead of any particular order.

For ease of description, when the foregoing apparatus is described, the foregoing apparatus is divided into various modules based on functions for separate description. Certainly, when the one or more implementations of the present specification are implemented, functions of the modules can be implemented in one or more pieces of software and/or hardware, or modules implementing the same function can be implemented by a combination of multiple submodules or subunits. The previously described apparatus implementations are merely examples. For example, the unit division is merely logical function division and can be other division during actual implementation. For example, multiple units or components can be combined or integrated into another system, or some features can be ignored or not performed. In addition, the displayed or discussed mutual couplings or direct couplings or communication connections can be implemented by using some interfaces. The indirect couplings or communication connections between the apparatuses or units can be implemented in electronic, mechanical, or other forms.

The present specification is described with reference to the flowcharts and/or block diagrams of the method, the apparatus (system), and the computer program product according to the implementations of the present specification. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable resource data updating device to generate a machine, so that the instructions executed by the computer or the processor of another programmable resource data updating device generate an apparatus for implementing a specific function in one or more processes in the flowcharts and/or in one or more blocks in the block diagrams.

Alternatively, these computer program instructions can be stored in a computer-readable memory that can instruct a computer or another programmable resource data updating device to work in a specific way, so that the instructions stored in the computer-readable memory generate an artifact that includes an instruction apparatus. The instruction apparatus implements a specific function in one or more processes in the flowcharts and/or in one or more blocks in the block diagrams.

Alternatively, these computer program instructions can be loaded onto the computer or another programmable resource data updating device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

In a typical configuration, a computing device includes one or more processors (CPUs), input/output interfaces, network interfaces, and memories.

The memory may include a non-persistent memory, a random access memory (RAM), a nonvolatile memory, and/or another form in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of the computer storage medium include but are not limited to a phase-change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, a graphene storage or another magnetic storage device, or any other non-transmission medium. The computer storage medium can be configured to store information that can be accessed by the computing device. Based on the definition in the present specification, the computer-readable medium does not include computer-readable transitory media such as a modulated data signal and carrier.

A person skilled in the art should understand that the one or more implementations of the present specification can be provided as a method, a system, or a computer program product. Therefore, the one or more implementations of the present specification can use a form of hardware only implementations, software only implementations, or implementations with a combination of software and hardware. In addition, the one or more implementations of the present specification can use a form of a computer program product that is implemented on one or more computer-usable storage media (including but not limited to a magnetic disk memory, a CD-ROM, an optical memory, etc.) that include computer-usable program code.

The one or more implementations of the present specification can be described in the general context of computer-executable instructions executed by a computer, such as a program module. Generally, the program module includes a routine, a program, an object, a component, a data structure, etc. executing a specific task or implementing a specific abstract data type. The one or more implementations of the present specification can be alternatively practiced in distributed computing environments. In these distributed computing environments, tasks are executed by remote processing devices that are connected by using a communications network. In a distributed computing environment, the program module can be located in both local and remote computer storage media including storage devices.

The implementations of the present specification are described in a progressive way. For same or similar parts of the implementations, mutual references can be made to the implementations. Each implementation focuses on a difference from other implementations. Especially, a system implementation is basically similar to a method implementation, and therefore is described briefly. For related parts, references can be made to some descriptions in the method implementations. In the description of the present specification, reference terms such as "an implementation", "some implementations", "example", "specific example", and "some examples" mean that specific features, structures, materials, or features described with reference to the implementation or example are included in at least one implementation or example in the present specification. In the present specification, the example expressions of the terms are not necessarily specific to the same implementation or example. In addition, the described specific features, structures, materials, or characteristics can be combined in a proper way in any one or more of the implementations or examples. In addition, a person skilled in the art can integrate or combine different implementations or examples and features of different implementations or examples described in the present specification, provided that they do not conflict with each other.

The previous descriptions are merely implementations of the one or more implementations of the present specification, and are not intended to limit the one or more implementations of the present specification. For a person skilled in the art, various modifications and changes can be made to the one or more implementations of the present specification. Any modification, equivalent replacement, improvement, etc. made within the spirit and principle of the present specification shall fall within the scope of the claims.

What is claimed is:

1. A computer-implemented method, comprising:
receiving, by a trusted server, from a first terminal, a first digital certificate of the first terminal, wherein the first digital certificate is issued by a certificate authority to the first terminal, the certificate authority being distinct from the trusted server;
verifying, based on the first digital certificate, an identity of the first terminal;
determining that the verification of the identity is a success;
based on determining that the verification of the identity is a success, determining, using a remote attestation protocol, that the first terminal is in a trusted state, the trusted state comprising that a running state of software of the first terminal conforms to an expected process;
based on determining that the first terminal is in the trusted state, adding a trusted identifier to the first digital certificate, to obtain a digital certificate,
wherein the trusted identifier is added to an extended field of the first digital certificate, such that existing information of the first digital certificate is not disturbed, and
wherein the trusted identifier indicates that the first terminal is in the trusted state; and
issuing the digital certificate comprising the trusted identifier to the first terminal, wherein the digital certificate is usable by a second terminal to verify the identity and the trusted state of the first terminal.

2. The computer-implemented method of claim 1, further comprising:
prior to determining that the first terminal is in the trusted state, confirming, by the trusted server, that the first digital certificate is valid.

3. The computer-implemented method of claim 2, wherein confirming that the first digital certificate is valid comprises at least one of:
verifying that a validity period of the first digital certificate is not expired, and
verifying that the first digital certificate is not included in a certificate authority revocation list of the certificate authority.

4. The computer-implemented method of claim 1, wherein determining, using the remote attestation protocol, that the first terminal is in the trusted state comprises:
receiving, from the first terminal, a measurement value signed using a private key stored in a trusted computing chip configured in the first terminal;
comparing the measurement value with a reference value of the first terminal stored in the trusted server; and
determining, based on determining that the measurement value matches the reference value, that the first terminal is in the trusted state.

5. A non-transitory, computer-readable medium storing one or more instructions executable by a computer system to perform operations comprising:
receiving, by a trusted server, from a first terminal, a first digital certificate of the first terminal, wherein the first digital certificate is issued by a certificate authority to the first terminal, the certificate authority being distinct from the trusted server;
verifying, based on the first digital certificate, an identity of the first terminal;
determining that the verification of the identity is a success;
based on determining that the verification of the identity is a success, determining, using a remote attestation protocol, that the first terminal is in a trusted state, the trusted state comprising that a running state of software of the first terminal conforms to an expected process;
based on determining that the first terminal is in the trusted state, adding a trusted identifier to the first digital certificate, to obtain a digital certificate,
wherein the trusted identifier is added to an extended field of the first digital certificate, such that existing information of the first digital certificate is not disturbed, and
wherein the trusted identifier indicates that the first terminal is in the trusted state; and
issuing the digital certificate comprising the trusted identifier to the first terminal, wherein the digital certificate is usable by a second terminal to verify the identity and the trusted state of the first terminal.

6. The computer-readable medium of claim 5, wherein the operations further comprise:
prior to determining that the first terminal is in the trusted state, confirming, by the trusted server, that the first digital certificate is valid.

7. The computer-readable medium of claim 6, wherein confirming that the first digital certificate is valid comprises at least one of:
verifying that a validity period of the first digital certificate is not expired, and
verifying that the first digital certificate is not included in a certificate authority revocation list of the certificate authority.

8. The computer-readable medium of claim 5, wherein determining, using the remote attestation protocol, that the first terminal is in the trusted state comprises:
receiving, from the first terminal, a measurement value signed using a private key stored in a trusted computing chip configured in the first terminal;
comparing the measurement value with a reference value of the first terminal stored in the trusted server; and
determining, based on determining that the measurement value matches the reference value, that the first terminal is in the trusted state.

9. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

receiving, by a trusted server, from a first terminal, a first digital certificate of the first terminal, wherein the first digital certificate is issued by a certificate authority to the first terminal, the certificate authority being distinct from the trusted server;

verifying, based on the first digital certificate, an identity of the first terminal;

determining that the verification of the identity is a success;

based on determining that the verification of the identity is a success, determining, using a remote attestation protocol, that the first terminal is in a trusted state, the trusted state comprising that a running state of software of the first terminal conforms to an expected process;

based on determining that the first terminal is in the trusted state, adding a trusted identifier to the first digital certificate, to obtain a digital certificate, wherein the trusted identifier is added to an extended field of the first digital certificate, such that existing information of the first digital certificate is not disturbed, and wherein the trusted identifier indicates that the first terminal is in the trusted state; and issuing the digital certificate comprising the trusted identifier to the first terminal, wherein the digital certificate is usable by a second terminal to verify the identity and the trusted state of the first terminal.

10. The computer-implemented system of claim 9, wherein the operations further comprise:

prior to determining that the first terminal is in the trusted state, confirming, by the trusted server, that the first digital certificate is valid.

11. The computer-implemented system of claim 10, wherein confirming that the first digital certificate is valid comprises at least one of:

verifying that a validity period of the first digital certificate is not expired, and verifying that the first digital certificate is not included in a certificate authority revocation list of the certificate authority.

12. The computer-implemented system of claim 9, wherein determining, using the remote attestation protocol, that the first terminal is in the trusted state comprises:

receiving, from the first terminal, a measurement value signed using a private key stored in a trusted computing chip configured in the first terminal;

comparing the measurement value with a reference value of the first terminal stored in the trusted server; and determining, based on determining that the measurement value matches the reference value, that the first terminal is in the trusted state.

13. The computer-implemented method of claim 4, wherein the trusted identifier comprises the reference value of the first terminal.

* * * * *